US012372219B2

(12) United States Patent
Castillo et al.

(10) Patent No.: US 12,372,219 B2
(45) Date of Patent: Jul. 29, 2025

(54) LED LUMINAIRE WITH A CAVITY, FINNED INTERIOR, AND A CURVED OUTER WALL EXTENDING FROM A SURFACE ON WHICH THE LIGHT SOURCE IS MOUNTED

(71) Applicant: CREE LIGHTING USA LLC, Racine, WI (US)

(72) Inventors: Mario A. Castillo, New Braunfels, TX (US); Kurt S. Wilcox, Libertyville, IL (US); Andrew Dan Bendtsen, Milwaukee, WI (US); Brian Kinnune, Racine, WI (US); Sandeep Pawar, Elmhurst, IL (US); David P Goelz, Milwaukee, WI (US)

(73) Assignee: CREE LIGHTING USA LLC, Racine, WI (US)

( * ) Notice: Subject to any disclaimer, the term of this patent is extended or adjusted under 35 U.S.C. 154(b) by 92 days.

(21) Appl. No.: 18/093,919

(22) Filed: Jan. 6, 2023

(65) Prior Publication Data

US 2023/0151944 A1 May 18, 2023

Related U.S. Application Data

(60) Continuation of application No. 17/185,335, filed on Feb. 25, 2021, now Pat. No. 11,549,659, which is a (Continued)

(51) Int. Cl.

| | |
|---|---|
| ***F21V 3/02*** | (2006.01) |
| ***F21S 8/04*** | (2006.01) |
| ***F21S 8/08*** | (2006.01) |
| ***F21V 5/00*** | (2018.01) |
| ***F21V 23/04*** | (2006.01) |

(Continued)

(52) U.S. Cl.
CPC ................ *F21V 3/02* (2013.01); *F21S 8/043* (2013.01); *F21S 8/086* (2013.01); *F21V 5/002* (2013.01); *F21V 23/0464* (2013.01); *F21V 3/049* (2013.01); *F21V 23/006* (2013.01); *F21W 2131/10* (2013.01); *F21W 2131/103* (2013.01);

(Continued)

(58) Field of Classification Search
CPC ........... F21S 8/043; F21S 8/086; F21V 5/002; F21V 23/0464; F21V 23/006; F21V 3/049; F21V 3/02; F21V 15/01; F21W 2131/10; F21W 2131/103; F21W 2131/105; F21Y 2105/10; F21Y 2115/10; F21Y 2103/10; G02B 6/4444; G02B 6/44775; H02G 15/013
See application file for complete search history.

(56) References Cited

U.S. PATENT DOCUMENTS 4,041,306 A * 8/1977 Compton .................. F21V 7/09 362/297
4,146,297 A * 3/1979 Alferness .............. G02F 1/3132 385/27

(Continued)

*Primary Examiner* — Andrew Jordan
(74) *Attorney, Agent, or Firm* — J. Clinton Wimbish; Maynard Nexsen PC

(57) ABSTRACT

An optical member includes a curved portion comprising an optically transmissive material. The enclosure has an outer surface and an inner surface opposite the outer surface. At least one light redirection feature protrudes from the inner surface. At least one indentation defined on the outer surface is configured to refract light.

20 Claims, 22 Drawing Sheets

Related U.S. Application Data division of application No. 14/618,884, filed on Feb. 10, 2015, now Pat. No. 10,935,211, which is a continuation-in-part of application No. 14/583,415, filed on Dec. 26, 2014, now Pat. No. 10,502,899, which is a continuation-in-part of application No. 14/462,322, filed on Aug. 18, 2014, now Pat. No. 9,632,295, which is a continuation-in-part of application No. 14/462,426, filed on Aug. 18, 2014, now Pat. No. 10,379,278, which is a continuation-in-part of application No. 14/462,391, filed on Aug. 18, 2014, now Pat. No. 9,513,424.

(60) Provisional application No. 62/009,039, filed on Jun. 6, 2014, provisional application No. 62/005,955, filed on May 30, 2014.

(51) Int. Cl.

| | |
|---|---|
| *F21V 3/04* | (2018.01) |
| *F21V 23/00* | (2015.01) |
| *F21W 131/10* | (2006.01) |
| *F21W 131/103* | (2006.01) |
| *F21W 131/105* | (2006.01) |
| *F21Y 105/10* | (2016.01) |
| *F21Y 115/10* | (2016.01) |

(52) U.S. Cl.
CPC .... *F21W 2131/105* (2013.01); *F21Y 2105/10* (2016.08); *F21Y 2115/10* (2016.08)

(56) References Cited

U.S. PATENT DOCUMENTS 4,371,916 A * 2/1983 De Martino ............ F21S 43/26 362/337
4,441,787 A * 4/1984 Lichtenberger ........ G02B 6/449 57/7
4,714,983 A * 12/1987 Lang ................. G02F 1/133615 362/613
4,914,553 A * 4/1990 Hamada ............... G02B 6/0048 362/311.06
4,954,930 A * 9/1990 Maegawa ............ G02B 6/0033 362/85
4,977,486 A * 12/1990 Gotoh .................... G01D 11/28 362/613
5,005,108 A * 4/1991 Pristash ............... G02B 6/0061 362/23.15
5,009,483 A * 4/1991 Rockwell, III ...... G02B 6/0065 385/116
5,026,161 A * 6/1991 Werner .................. G02B 6/283 356/460
5,040,098 A * 8/1991 Tanaka ................ G09F 13/0409 362/23.15
5,047,761 A * 9/1991 Sell .......................... B60Q 3/14 340/815.45
5,061,404 A * 10/1991 Wu ...................... C07D 277/82 252/582
5,081,564 A * 1/1992 Mizoguchi .............. F21S 43/26 362/268
5,097,258 A * 3/1992 Iwaki ....................... G08B 5/36 362/292
5,103,383 A * 4/1992 Mayhew ................ G08B 5/006 362/186
5,113,177 A * 5/1992 Cohen ................ G02B 27/0172 348/E13.041
5,113,472 A * 5/1992 Gualtieri .................. G02B 6/02 385/141
5,171,080 A * 12/1992 Bathurst .............. H01H 19/025 362/23.17
5,175,787 A * 12/1992 Gualtieri ................ G02B 6/122 385/141
5,186,865 A * 2/1993 Wu ...................... C07D 277/82 548/146
5,245,689 A * 9/1993 Gualtieri ................ G02B 6/122 385/142
5,253,317 A * 10/1993 Allen ..................... H01B 7/295 174/110 SR
5,295,019 A * 3/1994 Rapoport ........... G02B 27/1006 359/638
5,309,544 A * 5/1994 Saxe .................... G02B 6/0096 385/901
5,359,687 A * 10/1994 McFarland ............ G02B 6/138 430/326
5,359,691 A * 10/1994 Tai ...................... G02F 1/13362 362/561
5,396,350 A * 3/1995 Beeson ................ G02B 6/0053 359/251
5,398,179 A * 3/1995 Pacheco .................. F21V 19/00 362/364
5,400,224 A * 3/1995 DuNah ................ G02B 6/0043 362/616
5,416,684 A * 5/1995 Pearce ...................... F21V 5/00 362/310
5,428,468 A * 6/1995 Zimmerman ............. F21V 5/02 362/619
5,461,547 A * 10/1995 Ciupke ................ G02B 6/0038 362/330
5,462,700 A * 10/1995 Beeson ................ G03B 21/625 264/2.6
5,481,385 A * 1/1996 Zimmerman ..... G02F 1/133524 349/62
5,506,924 A * 4/1996 Inoue ..................... G02B 5/045 385/129
5,521,725 A * 5/1996 Beeson ................ G02B 6/0053 362/625
5,521,726 A * 5/1996 Zimmerman ........ G02B 5/3025 349/96
5,528,720 A * 6/1996 Winston ............ G02F 1/133615 385/129
5,537,304 A * 7/1996 Klaus ...................... F21V 29/15 362/147
5,541,039 A * 7/1996 McFarland ............. G02F 1/065 430/13
5,548,670 A * 8/1996 Koike .................. G02B 5/0236 385/27
5,553,092 A * 9/1996 Bruce ...................... H01S 3/093 372/72
5,555,109 A * 9/1996 Zimmerman ........ G02B 6/0053 349/63
5,555,160 A * 9/1996 Tawara ................ G02B 6/0046 362/330
5,555,329 A * 9/1996 Kuper .................. G02B 6/0028 385/36
5,572,411 A * 11/1996 Watai ................... G02B 5/0231 362/23.18
5,577,492 A * 11/1996 Parkyn, Jr. ........... G02B 6/4206 126/700
5,580,156 A * 12/1996 Suzuki ...................... F21V 7/09 116/63 P
5,584,556 A * 12/1996 Yokoyama ........... G02B 6/0038 362/330
5,598,280 A * 1/1997 Nishio ...................... F21V 5/04 362/627
5,598,281 A * 1/1997 Zimmerman ..... G02F 1/133606 349/5
5,613,751 A * 3/1997 Parker .................. G02B 6/0068 362/297
5,613,770 A * 3/1997 Chin, Jr. ................... F21V 1/06 248/220.1
5,657,408 A * 8/1997 Ferm .................... G02B 6/1228 264/1.27
5,658,066 A * 8/1997 Hirsch .................. F21V 21/005 362/225
5,659,410 A * 8/1997 Koike .................. G02B 6/0046 362/621
5,676,453 A * 10/1997 Parkyn, Jr. ............. G02B 6/003 362/291

(56) References Cited

U.S. PATENT DOCUMENTS 5,676,457 A * 10/1997 Simon ........................ F21V 7/00 362/268
5,677,702 A * 10/1997 Inoue ...................... G09F 11/29 345/32
5,685,634 A * 11/1997 Mulligan .............. G09F 27/008 362/345
5,696,865 A * 12/1997 Beeson .............. G02B 6/03611 385/124
5,702,176 A * 12/1997 Engle .................... F21V 15/015 362/225
5,718,497 A * 2/1998 Yokoyama ........... G02B 6/0036 362/330
5,719,619 A * 2/1998 Hattori ................... H04M 11/00 434/323
5,719,649 A * 2/1998 Shono .................. G02B 6/0036 362/617
5,727,107 A * 3/1998 Umemoto ............ G02B 6/0038 385/116
5,735,590 A * 4/1998 Kashima .............. G02B 6/0038 362/23.15
5,739,931 A * 4/1998 Zimmerman ............. F21V 5/02 359/834
5,748,828 A * 5/1998 Steiner .............. G02F 1/133621 359/291
5,761,355 A * 6/1998 Kuper .................. G02B 6/0053 385/36
5,769,522 A * 6/1998 Kaneko ................ G02B 6/0051 362/337
5,771,039 A * 6/1998 Ditzik ...................... G02B 6/08 257/E27.111
5,777,857 A * 7/1998 Degelmann ............... F21S 2/00 362/225
5,806,955 A * 9/1998 Parkyn, Jr. ............ F21V 7/0091 362/800
5,812,714 A * 9/1998 Hulse ................... G02B 6/4298 385/39
5,818,555 A * 10/1998 Yokoyama ........... G02B 6/0043 349/67
5,839,823 A * 11/1998 Hou ........................ F21V 5/005 362/333
5,850,498 A * 12/1998 Shacklette ........... G02B 6/1221 385/129
5,854,872 A * 12/1998 Tai ....................... G02B 6/4298 362/302
5,857,767 A * 1/1999 Hochstein ............. F21V 29/763 362/547
5,863,113 A * 1/1999 Oe ....................... G02B 6/0061 362/237
5,872,883 A * 2/1999 Ohba ..................... G02B 6/125 430/33
5,895,114 A * 4/1999 Thornton .............. F21V 19/007 362/306
5,897,201 A * 4/1999 Simon .................. G02B 6/0068 362/147
5,914,759 A * 6/1999 Higuchi ............... G02B 6/0053 349/64
5,914,760 A * 6/1999 Daiku .................. G02B 6/0053 349/95
5,949,933 A * 9/1999 Steiner ................. G02B 6/0053 385/36
5,961,198 A * 10/1999 Hira ..................... G02B 6/0036 362/621
5,967,637 A * 10/1999 Ishikawa .............. G02B 6/0046 264/5
5,974,214 A * 10/1999 Shacklette ............... G02B 6/13 385/98
5,997,148 A * 12/1999 Ohkawa ............... G02B 6/0038 385/901
5,999,281 A * 12/1999 Abbott ................... G03B 21/62 156/166
5,999,685 A * 12/1999 Goto .................... G02B 6/0038 362/617
6,002,829 A * 12/1999 Winston ............... G02B 6/0056 385/129
6,007,209 A * 12/1999 Pelka ................ G02F 1/133603 362/97.3
6,043,951 A * 3/2000 Lee ....................... G11B 5/5534
6,044,196 A * 3/2000 Winston ............... G02B 6/0038 359/833
6,050,707 A * 4/2000 Kondo ...................... F21V 7/04 362/346
6,079,838 A * 6/2000 Parker .................. G02B 6/0018 362/23.15
6,097,549 A * 8/2000 Jenkins ................... F21S 43/14 362/520
6,134,092 A * 10/2000 Pelka ................... G02B 6/0023 361/800
6,139,176 A * 10/2000 Hulse ................... G02B 6/0005 362/277
6,155,692 A * 12/2000 Ohkawa ............... G02B 6/0038 359/628
6,155,693 A * 12/2000 Spiegel ................... F21V 21/00 362/217.08
6,161,939 A * 12/2000 Bansbach ............... F21S 8/061 362/346
6,164,790 A * 12/2000 Lee ...................... G02B 6/0061 362/330
6,164,791 A * 12/2000 Gwo-Juh ............. G02B 6/0061 362/330
6,167,182 A * 12/2000 Shinohara ............ G02B 6/0046 385/129
6,185,357 B1 * 2/2001 Zou ...................... G02B 6/0096 362/339
6,206,535 B1 * 3/2001 Hattori ................. G02B 6/0046 362/616
6,231,200 B1 * 5/2001 Shinohara ............ G02B 6/0046 362/330
6,232,592 B1 * 5/2001 Sugiyama ............ G02B 6/0038 358/475
6,241,363 B1 * 6/2001 Lee ........................... F21V 9/40 362/333
6,241,367 B1 * 6/2001 Wedell .................... F21V 17/20 362/346
6,250,774 B1 * 6/2001 Begemann .............. F21S 8/086 362/240
6,257,737 B1 * 7/2001 Marshall ................... F21V 7/30 362/231
6,259,854 B1 * 7/2001 Shinji ...................... G02B 6/00 362/625
6,264,347 B1 * 7/2001 Godbillon ............... F21S 43/26 362/521
6,296,376 B1 * 10/2001 Kondo ...................... F21V 5/02 362/310
6,304,693 B1 * 10/2001 Buelow, II ........... G02B 6/4298 362/346
6,310,704 B1 * 10/2001 Dogan ................... H04B 7/086 398/9
6,318,886 B1 * 11/2001 Stopa ...................... F21S 45/47 362/555
6,379,016 B1 * 4/2002 Boyd ................... G02B 6/0038 362/348
6,379,017 B2 * 4/2002 Nakabayashi ....... G02B 6/0031 362/23.15
6,400,086 B1 * 6/2002 Huter ...................... F21V 13/04 315/56
6,421,103 B2 * 7/2002 Yamaguchi ....... G02F 1/133602 349/64
6,443,594 B1 * 9/2002 Marshall .............. G02B 3/0037 362/244
6,452,217 B1 * 9/2002 Wojnarowski .......... F21V 29/87 362/555
6,461,007 B2 * 10/2002 Akaoka ................ G02B 6/0038 362/610
6,473,554 B1 * 10/2002 Pelka ................... G02B 6/0061 385/901
6,480,307 B1 * 11/2002 Yang ...................... G02B 5/045 362/23.15

(56) References Cited

U.S. PATENT DOCUMENTS 6,481,130 B1 * 11/2002 Wu ........................ G02B 6/003 40/563
6,485,157 B2 * 11/2002 Ohkawa ............... G02B 6/0036 362/333
6,508,563 B2 * 1/2003 Parker .................. B60Q 1/0082 362/85
6,510,265 B1 * 1/2003 Giaretta ................... G02B 6/32 385/38
6,523,986 B1 * 2/2003 Hoffmann ............... E04F 19/02 362/374
6,536,921 B1 * 3/2003 Simon ..................... F21V 13/04 362/268
6,541,720 B2 * 4/2003 Gerald .................... F21V 27/00 439/211
6,547,416 B2 * 4/2003 Pashley ................... F21S 10/02 362/296.05
6,554,451 B1 * 4/2003 Keuper ..................... F21V 5/02 362/244
6,554,541 B1 * 4/2003 Antonsen ................ B63B 21/27 405/224.1
6,568,819 B1 * 5/2003 Yamazaki ............ G02B 6/0038 362/330
6,580,086 B1 * 6/2003 Schulz ................. A61B 5/6838 250/557
6,582,103 B1 * 6/2003 Popovich .................. F21V 7/24 361/240
6,585,356 B1 * 7/2003 Ohkawa ............... G02B 6/0038 347/65
6,598,998 B2 * 7/2003 West .................. G02B 19/0028 362/310
6,612,723 B2 * 9/2003 Futhey ...................... F21V 5/02 362/558
6,616,290 B2 * 9/2003 Ohkawa ............... G02B 6/0061 362/619
6,629,764 B1 * 10/2003 Uehara ................ G02B 6/0061 362/330
6,633,722 B1 * 10/2003 Kohara ................ G02B 6/0061 385/146
6,634,772 B2 * 10/2003 Yaphe ................... F21V 21/005 362/225
6,641,284 B2 * 11/2003 Stopa .................... F21V 17/164 362/240
6,644,841 B2 * 11/2003 Martineau ................. F21V 7/09 362/241
6,648,490 B2 * 11/2003 Klose ...................... F21S 8/024 362/372
6,784,357 B1 * 8/2004 Wang ...................... F21S 8/086 362/159
6,853,151 B2 * 2/2005 Leong ................ H05B 45/3578 362/240
6,871,983 B2 * 3/2005 Jacob ...................... F21V 27/00 362/147
6,880,952 B2 * 4/2005 Kiraly ..................... F21V 29/74 362/373
6,908,219 B1 * 6/2005 Reiss ..................... B60Q 1/302 362/338
6,942,361 B1 * 9/2005 Kishimura .......... F21V 19/0025 362/240
6,971,781 B2 * 12/2005 Guy ...................... F21V 7/0008 362/559
7,008,097 B1 * 3/2006 Hulse ........................ F21K 9/00 362/546
7,011,428 B1 * 3/2006 Hand ...................... F21V 15/01 362/217.05
7,021,799 B2 * 4/2006 Mizuyoshi .............. F21V 29/67 257/E33.072
7,021,805 B2 * 4/2006 Amano ................. F21V 7/0091 362/307
7,025,482 B2 * 4/2006 Yamashita ........... G02B 6/0038 362/348
7,067,992 B2 * 6/2006 Leong ....................... F21K 9/27 315/DIG. 4
7,090,370 B2 * 8/2006 Clark ...................... F21S 9/037 362/183
7,114,832 B2 * 10/2006 Holder .................. F21S 41/255 362/329
7,144,135 B2 * 12/2006 Martin .................... F21S 6/003 362/345
7,150,553 B2 * 12/2006 English ................. F21S 43/195 362/547
7,172,319 B2 * 2/2007 Holder .................... F21K 9/233 257/E33.071
7,196,459 B2 * 3/2007 Morris ................. H05K 1/0274 313/46
7,213,940 B1 * 5/2007 Van De Ven .......... H05B 45/20 257/89
7,217,009 B2 * 5/2007 Klose ...................... F21V 13/10 362/297
7,244,058 B2 * 7/2007 DiPenti ................. F21V 29/505 362/547
7,275,841 B2 * 10/2007 Kelly ...................... F21K 9/233 362/296.07
7,278,761 B2 * 10/2007 Kuan ...................... F21S 8/086 362/373
7,321,115 B2 * 1/2008 Langlois ................ H05B 47/11 250/214.1
7,329,030 B1 * 2/2008 Wang ...................... F21V 29/83 362/311.06
7,347,706 B1 * 3/2008 Wu .................... H01R 13/7175 430/642
7,407,307 B2 * 8/2008 Hiratsuka ............. F21V 17/164 362/241
7,420,811 B2 * 9/2008 Chan ..................... F21V 29/763 362/345
7,422,357 B1 * 9/2008 Chang .................. G02B 6/0028 362/628
7,434,959 B1 * 10/2008 Wang ...................... F21S 8/086 362/218
7,438,447 B2 * 10/2008 Holder ...................... F21V 7/04 362/296.07
7,488,093 B1 * 2/2009 Huang .................... F21S 8/086 362/373
7,520,641 B2 * 4/2009 Minano ................. F21V 7/0091 362/346
7,534,013 B1 * 5/2009 Simon ..................... F21V 5/046 362/244
7,547,126 B2 * 6/2009 Hiratsuka ............ F21V 7/0025 362/241
7,566,159 B2 * 7/2009 Oon ........................ H01L 33/62 257/676
7,593,229 B2 * 9/2009 Shuy ....................... F21V 29/86 361/701
7,593,615 B2 * 9/2009 Chakmakjian ....... G02B 6/0038 362/346
7,628,508 B2 * 12/2009 Kita .......................... F21V 9/08 362/240
7,635,205 B2 * 12/2009 Yu ........................... F21V 29/83 362/373
7,637,633 B2 * 12/2009 Wong ...................... F21V 29/83 362/547
7,639,918 B2 * 12/2009 Sayers .................. G02B 6/001 362/621
7,641,363 B1 * 1/2010 Chang ................... F21V 29/713 362/345
7,648,257 B2 * 1/2010 Villard .................... F21V 29/70 362/249.02
7,658,510 B2 * 2/2010 Russell ................. F21V 29/506 362/249.02
7,667,477 B2 * 2/2010 Nagata ................... G01R 29/26 257/E21.531
7,726,840 B2 * 6/2010 Pearson .................. F21S 2/005 362/249.02
7,736,019 B2 * 6/2010 Shimada ................. F21V 13/02 362/249.14
7,766,508 B2 * 8/2010 Villard ...................... F21S 4/20 362/249.02
7,794,127 B2 * 9/2010 Huang .................... H01L 33/54 257/E33.001

(56) References Cited

U.S. PATENT DOCUMENTS

| | | | | |
|---|---|---|---|---|
| 7,800,125 | B2 * | 9/2010 | Chen | G02B 19/0061 362/257 |
| 7,802,902 | B2 * | 9/2010 | Moss | H05B 45/10 362/249.02 |
| 7,810,960 | B1 * | 10/2010 | Soderman | F21S 8/04 362/249.02 |
| 7,813,131 | B2 * | 10/2010 | Liang | F21V 23/02 174/547 |
| 7,857,619 | B2 * | 12/2010 | Liu | G02B 3/08 433/29 |
| 7,938,562 | B2 * | 5/2011 | Ivey | F21V 23/0435 362/276 |
| 7,959,330 | B2 * | 6/2011 | Hashimoto | F21V 29/83 362/373 |
| 7,963,664 | B2 * | 6/2011 | Bertram | G02B 19/0066 362/346 |
| 7,967,477 | B2 * | 6/2011 | Bloemen | G02B 19/0066 362/255 |
| D641,923 | S * | 7/2011 | Radchenko | D26/138 |
| 7,980,723 | B2 * | 7/2011 | Kosters | F21S 8/04 362/225 |
| 8,002,426 | B2 * | 8/2011 | Pearson | F21V 33/006 362/217.1 |
| 8,061,870 | B2 * | 11/2011 | Pearson | F21S 8/033 362/249.02 |
| 8,061,875 | B2 * | 11/2011 | Zhang | F21V 29/70 362/218 |
| 8,068,288 | B1 * | 11/2011 | Pitou | F21V 5/04 359/743 |
| 8,070,306 | B2 * | 12/2011 | Ruud | F21V 21/30 362/249.02 |
| 8,100,556 | B2 * | 1/2012 | Patrick | F21V 14/02 362/249.02 |
| 8,113,687 | B2 * | 2/2012 | Villard | F21V 15/01 362/249.02 |
| 8,123,382 | B2 * | 2/2012 | Patrick | F21V 29/74 362/249.02 |
| 8,186,855 | B2 * | 5/2012 | Wassel | F21K 9/90 362/249.02 |
| 8,206,009 | B2 * | 6/2012 | Tickner | F21V 29/73 362/373 |
| 8,215,787 | B2 * | 7/2012 | Mathai | E04B 9/241 362/330 |
| 8,232,745 | B2 * | 7/2012 | Chemel | H05B 47/19 315/307 |
| 8,253,154 | B2 * | 8/2012 | Jung | G02B 19/0061 257/E33.068 |
| 8,272,756 | B1 * | 9/2012 | Patrick | F21S 8/04 362/249.02 |
| 8,277,106 | B2 * | 10/2012 | Van Gorkom | G02B 6/0028 362/616 |
| 8,287,152 | B2 * | 10/2012 | Gill | F21V 29/75 362/249.02 |
| 8,288,951 | B2 * | 10/2012 | Storch | H10K 50/00 315/297 |
| 8,317,366 | B2 * | 11/2012 | Dalton | F21V 5/002 362/614 |
| 8,322,881 | B1 * | 12/2012 | Wassel | F21S 8/026 362/217.05 |
| 8,324,817 | B2 * | 12/2012 | Ivey | H05B 47/10 315/153 |
| 8,330,342 | B2 * | 12/2012 | Bhairi | G02B 19/0061 362/329 |
| 8,348,489 | B2 * | 1/2013 | Holman | G02B 6/0083 349/111 |
| 8,353,606 | B2 * | 1/2013 | Jeong | F21V 19/001 362/240 |
| 8,366,296 | B2 * | 2/2013 | Newman | F21V 15/01 362/249.02 |
| 8,382,387 | B1 * | 2/2013 | Sandoval | G03B 29/00 362/253 |
| 8,398,276 | B2 * | 3/2013 | Pearson | F21V 21/025 362/248 |
| 8,408,737 | B2 * | 4/2013 | Wright | G09F 13/22 362/237 |
| 8,408,739 | B2 * | 4/2013 | Villard | F21V 19/02 362/249.02 |
| 8,414,304 | B2 * | 4/2013 | Mathai | H10K 59/80 257/E21.026 |
| 8,419,224 | B2 * | 4/2013 | Wan-Chih | F21V 29/74 362/249.02 |
| 8,425,071 | B2 * | 4/2013 | Ruud | F21V 29/83 362/249.02 |
| 8,434,892 | B2 * | 5/2013 | Zwak | G02B 6/0018 362/249.02 |
| 8,434,893 | B2 * | 5/2013 | Boyer | F21V 7/18 362/240 |
| 8,469,567 | B2 * | 6/2013 | Futami | F21V 5/02 362/249.02 |
| 8,472,775 | B2 * | 6/2013 | Corbille | G02B 6/445 385/135 |
| 8,475,010 | B2 * | 7/2013 | Vissenberg | G02B 6/0011 362/326 |
| 8,485,684 | B2 * | 7/2013 | Lou | F21V 7/005 362/217.05 |
| 8,511,862 | B2 * | 8/2013 | Ishida | F21S 8/08 313/46 |
| 8,519,424 | B2 * | 8/2013 | Hammond | H10K 50/88 257/E33.056 |
| 8,529,100 | B1 * | 9/2013 | Patrick | F21V 29/763 362/431 |
| 8,547,022 | B2 * | 10/2013 | Summerford | H05B 41/16 315/250 |
| 8,547,983 | B2 * | 10/2013 | Diab | H04L 12/12 370/254 |
| 8,567,983 | B2 * | 10/2013 | Boyer | F21V 7/24 362/153.1 |
| 8,573,823 | B2 * | 11/2013 | Dau | F21V 7/0016 362/560 |
| 8,593,070 | B2 * | 11/2013 | Wang | H05B 45/39 363/125 |
| D695,447 | S * | 12/2013 | Speier | D26/118 |
| 8,646,944 | B2 * | 2/2014 | Villard | F21K 9/65 362/249.02 |
| 8,651,719 | B2 * | 2/2014 | Teng | G06F 3/042 362/559 |
| 8,657,463 | B2 * | 2/2014 | Lichten | A01K 31/18 362/217.05 |
| 8,696,169 | B2 * | 4/2014 | Tickner | F21V 15/01 362/249.02 |
| 8,696,173 | B2 * | 4/2014 | Urtiga | F21V 7/0091 362/276 |
| 8,702,281 | B2 * | 4/2014 | Okada | F21S 43/245 362/311.06 |
| 8,777,453 | B2 * | 7/2014 | Donegan | H05B 47/19 362/249.05 |
| 8,814,396 | B2 * | 8/2014 | Ishida | F21V 5/04 362/373 |
| 8,836,221 | B2 * | 9/2014 | Storch | H05B 47/10 315/297 |
| D726,947 | S * | 4/2015 | Boyer | D26/71 |
| D729,966 | S * | 5/2015 | Szalontai | D26/70 |
| D729,967 | S * | 5/2015 | Szalontai | D26/71 |
| D729,968 | S * | 5/2015 | Szalontai | D26/71 |
| 9,028,087 | B2 * | 5/2015 | Wilcox | F21V 19/04 362/249.02 |
| 9,028,096 | B2 * | 5/2015 | Verdes | F21V 29/507 362/373 |
| 9,039,223 | B2 * | 5/2015 | Rudd | F21V 29/507 362/249.02 |
| 9,039,253 | B2 * | 5/2015 | Jin | F21V 23/026 362/154 |
| 9,072,127 | B2 * | 6/2015 | Lu | F21V 23/003 |
| 9,086,217 | B2 * | 7/2015 | Eckert | F21V 29/83 |
| 9,099,592 | B2 * | 8/2015 | Derryberry | H01L 31/0543 |
| 9,182,096 | B2 * | 11/2015 | Kinnune | F21K 9/20 |
| 9,206,973 | B2 * | 12/2015 | Fussell | F21S 8/026 |

(56) References Cited

U.S. PATENT DOCUMENTS 9,212,808 B2 * 12/2015 Higley .................... F21V 15/01
9,239,150 B2 * 1/2016 Sieberth ................ F21V 29/507
9,243,794 B2 * 1/2016 Wilcox ..................... F21V 5/04
9,261,270 B2 * 2/2016 Ruud ...................... F21V 29/70
9,353,927 B2 * 5/2016 Ishida ..................... F21V 29/76
9,366,396 B2 * 6/2016 Yuan ..................... F21V 29/773
9,366,799 B2 * 6/2016 Wilcox ................ G02B 6/0045
9,389,367 B2 * 7/2016 Yuan .................... G02B 6/0031
9,400,363 B2 * 7/2016 Coenegracht ...... G02B 6/44775
9,423,085 B2 * 8/2016 Zahn ......................... F21K 9/64
9,448,353 B2 * 9/2016 Holman ................. G02B 6/005
9,464,766 B2 * 10/2016 Clauss .................... F21V 29/70
9,506,635 B2 * 11/2016 Gattari .................... F21S 8/086
9,534,775 B2 * 1/2017 Wilcox ................. F21V 15/013
9,541,246 B2 * 1/2017 Ruud ...................... F21S 8/086
9,562,655 B2 * 2/2017 Villard ...................... F21K 9/90
9,568,662 B2 * 2/2017 Lim ....................... G02B 6/262
9,574,735 B2 * 2/2017 Benitez .............. G02B 27/0961
9,581,751 B2 * 2/2017 Yuan .................... G02B 6/0031
9,593,827 B2 * 3/2017 Ji ........................... H05B 45/20
9,593,838 B2 * 3/2017 Van Es ................. F21V 29/507
9,625,638 B2 * 4/2017 Durkee ................ G02B 6/0028
9,632,214 B2 * 4/2017 Streppel ............... G02B 3/0006
9,632,268 B2 * 4/2017 Coenegracht ........ G02B 6/4444
9,632,295 B2 * 4/2017 Castillo ..................... F21V 5/04
9,642,201 B2 * 5/2017 Lu .......................... H05B 45/10
9,651,740 B2 * 5/2017 Tarsa ....................... G02B 6/26
9,699,854 B2 * 7/2017 Wassel .................... F21V 7/005
9,709,242 B2 * 7/2017 Benitez ............... F21V 23/0457
9,709,725 B2 * 7/2017 Wilcox ................ G02B 6/0073
9,798,072 B2 * 10/2017 Wilcenski ............ G02B 6/0033
9,835,317 B2 * 12/2017 Yuan .................... G02B 6/0045
9,945,527 B2 * 4/2018 Jha ........................ F21S 41/141
9,952,372 B2 * 4/2018 Wilcox .................... G02B 6/24
9,966,751 B2 * 5/2018 Thompson ............... H01B 3/46
9,982,876 B2 * 5/2018 Li ......................... F21V 23/005
9,989,213 B2 * 6/2018 Sun ........................... F21V 7/24
10,018,343 B2 * 7/2018 Wasserman ......... F21V 23/0435
10,042,106 B2 * 8/2018 Wilcox .................... G02B 6/24
10,054,741 B2 * 8/2018 Smith ................ G02B 6/44765
10,168,023 B1 * 1/2019 Hein ....................... F21S 8/086
10,174,893 B2 * 1/2019 Kim ...................... F21V 23/026
10,208,907 B2 * 2/2019 Wang ...................... F21S 8/085
10,209,429 B2 * 2/2019 van de Ven .......... G02B 6/0021
10,223,946 B2 * 3/2019 Auyeung ................ F21V 29/74
10,241,289 B2 * 3/2019 Claessens ............ G02B 6/4477
10,268,010 B2 * 4/2019 Pasek ..................... H02G 3/083
10,277,024 B2 * 4/2019 Thompson ........... H05K 5/0221
10,317,028 B2 * 6/2019 Bochenek ............... F21V 15/01
10,317,060 B2 * 6/2019 Nimma ............... F21V 23/0471
10,317,608 B2 * 6/2019 Lim ..................... G02B 6/0016
10,323,807 B2 * 6/2019 Sterkina .................. F21V 5/007
10,337,693 B1 * 7/2019 Gordin ...................... F21V 3/00
10,339,841 B2 * 7/2019 Auyeung .............. F21V 29/745
10,344,948 B1 * 7/2019 Gordin .................... F21V 11/04
10,371,912 B2 * 8/2019 Coenegracht ........ H02G 15/013
10,410,551 B2 * 9/2019 Auyeung ................ G09F 13/02
10,416,377 B2 * 9/2019 Girotto ............... F21V 23/0485
10,422,944 B2 * 9/2019 Yuan ....................... F21S 8/026
10,436,969 B2 * 10/2019 Yuan ......................... F21K 9/61
10,460,634 B2 * 10/2019 Auyeung ................ F21S 6/006
10,527,785 B2 * 1/2020 Tarsa .................. F21V 23/0435
10,612,753 B2 * 4/2020 Clynne ................... F21V 15/01
10,656,356 B2 * 5/2020 Bryon .................. G02B 6/4446
D886,355 S * 6/2020 Chen .............................. D26/92
10,690,315 B2 * 6/2020 Lowes ................... F21V 15/04
10,741,107 B2 * 8/2020 Hall ....................... H01B 11/02
10,811,862 B2 * 10/2020 Kempeneers ........ H02G 15/046
10,816,179 B2 * 10/2020 Nimma ................... F21V 5/007
D906,578 S * 12/2020 Smith ........................... D26/92
10,890,714 B2 * 1/2021 Tarsa ................... G02B 6/0045
10,891,881 B2 * 1/2021 Auyeung .............. F21V 31/005
10,901,164 B2 * 1/2021 Claessens ............ G02B 6/3897
10,920,959 B2 * 2/2021 Vasylyev .......... G02F 1/133603
10,935,211 B2 * 3/2021 Castillo ..................... F21V 3/02
10,948,156 B2 * 3/2021 Thijssen ................... F21K 9/27
D926,703 S * 8/2021 Yang ....................... H02G 3/081
D13/152
11,099,317 B2 * 8/2021 Yuan .................... G02B 6/0046
11,300,269 B2 * 4/2022 Vasylyev .............. F21V 7/0083
11,372,156 B2 * 6/2022 Tarsa ................... G02B 6/0076
11,408,572 B2 * 8/2022 Lim ....................... G02B 6/305
11,428,887 B2 * 8/2022 Liefsoens ............ G02B 6/4454
D966,199 S * 10/2022 Yang ....................... H02S 20/23
D13/152
11,549,659 B2 * 1/2023 Castillo ................... F21V 5/002
RE49,637 E * 8/2023 Kinnune ................ H05B 45/24
315/193
11,726,284 B2 * 8/2023 Geens ................ G02B 6/44465
385/135
11,774,047 B2 * 10/2023 Van Bommel ............ F21K 9/62
362/84
11,822,141 B2 * 11/2023 Allen ................... G02B 6/4471
11,874,517 B2 * 1/2024 Geens .................. G02B 6/3825
D1,015,279 S * 2/2024 Yang ............................ D13/152
11,959,631 B2 * 4/2024 Wassel .................... F21V 7/048
2001/0009265 A1 * 7/2001 Schulz ............... A61B 5/02427
250/227.14
2001/0019479 A1 * 9/2001 Nakabayashi ....... G02B 6/0028
349/64
2002/0061178 A1 * 5/2002 Winston .............. G09F 13/0409
385/11
2002/0172039 A1 * 11/2002 Inditsky ............... G02B 6/0043
362/231
2003/0002282 A1 * 1/2003 Swaris .................... F21V 29/70
362/249.06
2003/0034985 A1 * 2/2003 Needham Riddle ...... G01J 1/08
345/589
2003/0117798 A1 * 6/2003 Leysath .................... F21S 8/04
362/240
2003/0156417 A1 * 8/2003 Gasquet ................ F21V 7/0091
362/329
2003/0227774 A1 * 12/2003 Martin .................... F21V 29/77
362/240
2004/0008952 A1 * 1/2004 Kragl ....................... C25D 1/10
257/E33.071
2004/0037088 A1 * 2/2004 English ................. F21S 43/195
362/652
2004/0080938 A1 * 4/2004 Holman .................. F21S 41/12
362/245
2004/0135933 A1 * 7/2004 Leu ...................... G02B 6/0043
349/61
2004/0146241 A1 * 7/2004 Deladurantaye ..... G02B 6/4249
385/146
2004/0213003 A1 * 10/2004 Lauderdale ............... F21S 2/00
362/404
2004/0240217 A1 * 12/2004 Rice ......................... B60Q 1/12
362/465
2004/0264188 A1 * 12/2004 Tazawa ................ G02B 6/0038
257/E33.071
2005/0111220 A1 * 5/2005 Smith .................. F21V 7/0083
362/235
2005/0111235 A1 * 5/2005 Suzuki .................. F21V 7/0091
362/555
2005/0116597 A1 * 6/2005 Hsu ........................... F21K 9/64
313/113
2005/0190564 A1 * 9/2005 Amano ................... F21S 43/14
362/336
2005/0201103 A1 * 9/2005 Saccomanno ........... F21V 7/005
362/341
2005/0210643 A1 * 9/2005 Mezei .................... G02B 6/001
29/25
2006/0002146 A1 * 1/2006 Baba ................. G02F 1/133603
362/613
2006/0051017 A1 * 3/2006 Hallemeier ............. H04J 14/04
385/28
2006/0056169 A1 * 3/2006 Lodhie ................... H05B 45/40
362/97.3
2006/0076568 A1 * 4/2006 Keller ................ G02B 19/0061
257/E33.072

(56) References Cited

U.S. PATENT DOCUMENTS

2006/0120085 A1* 6/2006 Hsieh .................... G02B 3/08 362/338
2006/0176695 A1* 8/2006 Gordin .................. H05B 41/40 362/431
2006/0193139 A1* 8/2006 Sun ........................ F21V 29/67 362/373
2006/0232984 A1* 10/2006 Schuknecht .......... F21V 23/026 362/345
2006/0262521 A1* 11/2006 Piepgras ................ F21V 29/70 362/404
2006/0262545 A1* 11/2006 Piepgras ................ F21S 8/06 362/373
2007/0062032 A1* 3/2007 Ter-Hovhannissian .................... H05K 1/0203 29/846
2007/0076427 A1* 4/2007 Reo ........................ F21V 29/70 362/555
2007/0081339 A1* 4/2007 Chung .................... F21V 29/74 362/373
2007/0081780 A1* 4/2007 Scholl .................. G02B 6/0068 385/129
2007/0086179 A1* 4/2007 Chen .................... G02B 6/0021 362/621
2007/0115569 A1* 5/2007 Tang ...................... G02B 5/045 359/831
2007/0121340 A1* 5/2007 Hoshi .................. G02B 6/0036 362/600
2007/0121343 A1* 5/2007 Brown ................ F21V 33/0052 348/E7.079
2007/0139905 A1* 6/2007 Birman ................ G02B 6/0028 362/23.07
2007/0152231 A1* 7/2007 Destain .................. H01L 33/58 257/E33.073
2007/0153526 A1* 7/2007 Lim ...................... F21V 19/0055 362/294
2007/0189033 A1* 8/2007 Watanabe ............ G02B 6/0038 362/606
2007/0195527 A1* 8/2007 Russell .................. F21S 8/06 362/240
2007/0201225 A1* 8/2007 Holder ............... G02B 19/0071 257/E33.073
2007/0211463 A1* 9/2007 Chevalier ............ H05B 47/175 700/298
2007/0217192 A1* 9/2007 Hiratsuka ........... F21V 19/0035 362/225
2007/0230171 A1* 10/2007 Hiratsuka ................ F21S 4/28 362/235
2007/0242473 A1* 10/2007 Lee ...................... G02B 6/0096 362/551
2007/0245607 A1* 10/2007 Awai .................... G02B 6/0091 40/546
2007/0247856 A1* 10/2007 Wang ....................... F21V 7/09 362/346
2007/0253058 A1* 11/2007 Wood ..................... G03B 21/60 359/455
2007/0257610 A1* 11/2007 Shen ...................... H01L 33/54 257/E33.059
2007/0263388 A1* 11/2007 Lai ......................... F21V 14/02 362/287
2007/0274654 A1* 11/2007 Choudhury ............ G02B 6/136 385/131
2007/0278005 A1* 12/2007 Holmberg ............. H02G 3/088 174/655
2007/0285927 A1* 12/2007 Chen ...................... F21V 29/89 362/346
2008/0002399 A1* 1/2008 Villard .................. F21V 17/107 362/184
2008/0002410 A1* 1/2008 Burton ...................... F21K 9/00 362/294
2008/0030986 A1* 2/2008 Ogawa ................ H01L 25/0753 257/E25.02
2008/0037284 A1* 2/2008 Rudisill .................. F21V 23/06 362/629
2008/0055908 A1* 3/2008 Wu ......................... F21V 29/83 362/373
2008/0062689 A1* 3/2008 Villard .................... F21V 14/02 362/249.07
2008/0062691 A1* 3/2008 Villard .................... F21V 19/02 362/249.16
2008/0078524 A1* 4/2008 Wilcox ................. F21V 29/763 165/11.1
2008/0080162 A1* 4/2008 Wilcox ................... F21V 29/75 362/20
2008/0080196 A1* 4/2008 Ruud ...................... F21V 31/03 362/373
2008/0089069 A1* 4/2008 Medendorp ............. F21V 29/70 362/294
2008/0089070 A1* 4/2008 Wang .................. F28D 15/0275 362/373
2008/0123340 A1* 5/2008 McClellan ................ F21K 9/00 362/232
2008/0137695 A1* 6/2008 Takahashi ............ G02B 6/1228 372/19
2008/0179614 A1* 7/2008 Wang ...................... H01L 33/54 257/E33.059
2008/0186273 A1* 8/2008 Krijn ................. G02F 1/133609 362/231
2008/0192458 A1* 8/2008 Li .......................... G02B 6/005 313/498
2008/0192476 A1* 8/2008 Hiratsuka ................. F21S 4/20 362/285
2008/0198572 A1* 8/2008 Medendorp ............... F21V 9/08 362/84
2008/0199143 A1* 8/2008 Turner .............. G02B 19/0033 385/146
2008/0204888 A1* 8/2008 Kan ........................ F21V 13/04 359/629
2008/0212329 A1* 9/2008 Duguay .................. F21V 14/02 362/310
2008/0219001 A1* 9/2008 Russell ................. F21V 29/763 362/246
2008/0231201 A1* 9/2008 Higley .................... F21V 29/74 315/312
2008/0239722 A1* 10/2008 Wilcox ................... F21V 31/04 362/268
2008/0239750 A1* 10/2008 Chang ..................... F21V 13/10 362/296.07
2008/0239751 A1* 10/2008 Chang ..................... F21V 13/12 362/296.07
2008/0247170 A1* 10/2008 Peck ..................... F21V 7/0008 362/297
2008/0253122 A1* 10/2008 Hancock ................... F21S 4/28 362/249.12
2008/0253125 A1* 10/2008 Kang ...................... F21V 29/83 362/294
2008/0273331 A1* 11/2008 Moss ................... H05B 45/375 315/309
2008/0278954 A1* 11/2008 Speier .................... H05K 1/141 257/E21.511
2008/0296589 A1* 12/2008 Speier ................... H01L 33/642 257/E33.001
2008/0304267 A1* 12/2008 Lin ....................... F21V 19/005 362/294
2009/0103293 A1* 4/2009 Harbers .................. F21V 14/08 362/230
2009/0168395 A1* 7/2009 Mrakovich ............. F21V 31/04 362/223
2009/0196071 A1* 8/2009 Matheson ............ G02B 6/0021 362/623
2009/0257242 A1* 10/2009 Wendman ............ G02B 6/0003 362/553
2009/0297090 A1* 12/2009 Bogner ................ G02B 6/0028 385/14
2009/0309494 A1* 12/2009 Patterson ............. G09F 9/3026 445/24
2009/0323334 A1* 12/2009 Roberts ..................... F21S 4/28 362/247

(56) References Cited

U.S. PATENT DOCUMENTS

2010/0008088 A1* 1/2010 Koizumi ................. F21S 43/14 362/235
2010/0027257 A1* 2/2010 Boonekamp ....... G02B 19/0028 362/311.12
2010/0046219 A1* 2/2010 Pijlman ................ G02B 6/0036 362/235
2010/0053959 A1* 3/2010 Ijzerman .............. G02B 6/0073 362/327
2010/0073597 A1* 3/2010 Bierhuizen .......... G02B 6/0021 349/62
2010/0079843 A1* 4/2010 Derichs .................. G02B 26/02 359/263
2010/0079980 A1* 4/2010 Sakai ................... G02B 6/0016 362/311.06
2010/0102730 A1* 4/2010 Simon ................. F21V 23/0457 324/403
2010/0118531 A1* 5/2010 Montagne .......... G02B 19/0061 359/708
2010/0128483 A1* 5/2010 Reo ........................... F21V 5/00 362/249.02
2010/0133422 A1* 6/2010 Lin ......................... F24S 23/00 250/227.11
2010/0141153 A1* 6/2010 Recker ................. H05B 45/357 315/149
2010/0157577 A1* 6/2010 Montgomery ....... G02B 6/0018 362/97.2
2010/0195335 A1* 8/2010 Allen ...................... F21V 5/048 362/335
2010/0202142 A1* 8/2010 Morgan ................... F21S 11/00 362/346
2010/0208460 A1* 8/2010 Ladewig ................. F21V 29/75 362/249.02
2010/0220484 A1* 9/2010 Shani ................... G02B 6/0025 362/296.09
2010/0220497 A1* 9/2010 Ngai ...................... G02B 6/006 362/610
2010/0231143 A1* 9/2010 May .......................... F21K 9/62 315/312
2010/0238645 A1* 9/2010 Bailey ................ G02B 19/0028 362/296.01
2010/0238671 A1* 9/2010 Catone .................... F21S 8/086 362/373
2010/0290234 A1* 11/2010 Bierhuizen ............... F21V 5/04 257/E33.068
2010/0301360 A1* 12/2010 van de Ven ............... F21V 3/02 257/E33.061
2010/0301769 A1* 12/2010 Chemel ................ H05B 47/199 315/294
2010/0302218 A1* 12/2010 Bita ..................... G02B 6/0065 345/204
2010/0302616 A1* 12/2010 Bita ..................... G02B 6/0036 264/1.24
2010/0302783 A1* 12/2010 Shastry .............. G02B 19/0061 359/727
2010/0302803 A1* 12/2010 Bita ..................... G02B 6/0036 362/612
2010/0309677 A1* 12/2010 Kazaoka ............... F21S 43/249 362/519
2010/0315833 A1* 12/2010 Holman .................... F21K 9/23 362/606
2010/0320904 A1* 12/2010 Meir .................... G02B 6/0061 315/32
2010/0328936 A1* 12/2010 Pance ..................... H01L 33/08 257/89
2011/0007505 A1* 1/2011 Wang ...................... F21V 5/045 362/235
2011/0013397 A1* 1/2011 Catone ................ F21V 19/0055 362/244
2011/0013420 A1* 1/2011 Coleman ................... F21S 8/06 362/613
2011/0037388 A1* 2/2011 Lou ......................... F21K 9/232 313/46
2011/0044022 A1* 2/2011 Ko ..................... G02B 19/0061 313/501
2011/0044582 A1* 2/2011 Travis .................... G02B 5/045 359/641
2011/0058372 A1* 3/2011 Lerman ................. F21V 19/005 362/249.02
2011/0063830 A1* 3/2011 Narendran ............. F21V 5/004 977/774
2011/0063838 A1* 3/2011 Dau ........................ F21V 21/16 362/235
2011/0063843 A1* 3/2011 Cook ...................... F21V 29/75 362/249.02
2011/0063855 A1* 3/2011 Vissenberg .......... G02B 6/0038 362/311.12
2011/0122616 A1* 5/2011 Hochstein ............... F21V 15/01 362/249.02
2011/0163681 A1* 7/2011 Dau ........................ F21V 23/06 315/294
2011/0163683 A1* 7/2011 Steele ....................... F21V 7/06 315/192
2011/0164853 A1* 7/2011 Corbille ................. G02B 6/445 174/50.5
2011/0170289 A1* 7/2011 Allen ........................ F21K 9/60 362/310
2011/0180818 A1* 7/2011 Lerman ............... H01L 25/0753 257/88
2011/0187273 A1* 8/2011 Summerford .......... H05B 47/10 315/250
2011/0193105 A1* 8/2011 Lerman ..................... F21K 9/20 257/E33.061
2011/0193106 A1* 8/2011 Lerman ..................... F21K 9/20 257/E33.061
2011/0193114 A1* 8/2011 Lerman ................... H01L 33/08 257/91
2011/0195532 A1* 8/2011 Lerman ............... H01L 25/0753 257/E33.061
2011/0198632 A1* 8/2011 Lerman ..................... F21K 9/64 257/91
2011/0199769 A1* 8/2011 Bretschneider ......... F21V 13/14 362/249.02
2011/0204390 A1* 8/2011 Lerman ............... H01L 25/0753 257/E33.061
2011/0204391 A1* 8/2011 Lerman ..................... F21K 9/64 257/E27.121
2011/0210861 A1* 9/2011 Winton .................. G08B 7/062 340/815.45
2011/0228527 A1* 9/2011 Van Gorkom ....... G02B 27/145 362/231
2011/0233568 A1* 9/2011 An .......................... F21S 8/086 257/E33.055
2011/0248287 A1* 10/2011 Yuan ....................... H01L 33/60 257/E33.056
2011/0249467 A1* 10/2011 Boonekamp .............. F21K 9/61 362/555
2011/0261570 A1* 10/2011 Okada ................... F21S 43/239 362/311.06
2011/0273079 A1* 11/2011 Pickard ................. H01L 33/504 313/483
2011/0273882 A1* 11/2011 Pickard ..................... F21K 9/68 362/296.08
2011/0280043 A1* 11/2011 Van Ostrand ........ G02B 6/0028 362/606
2011/0299807 A1* 12/2011 Kim ................... G01N 21/7746 385/12
2011/0305018 A1* 12/2011 Angelini ............... F21V 17/104 362/238
2011/0305027 A1* 12/2011 Ham ..................... F21V 29/507 362/373
2011/0317436 A1* 12/2011 Kuan ...................... F21V 19/02 362/373
2012/0008338 A1* 1/2012 Ono ..................... G02B 6/0041 362/606
2012/0019942 A1* 1/2012 Morgan ............. G02B 19/0028 359/853
2012/0026728 A1* 2/2012 Lou ......................... F21V 7/005 362/217.05

(56) References Cited

U.S. PATENT DOCUMENTS

2012/0026828 A1* 2/2012 Fjellstad ................. B63B 21/66 367/17
2012/0033445 A1* 2/2012 Desmet ................ G02B 6/0038 362/606
2012/0039073 A1* 2/2012 Tong ..................... F21V 7/0008 362/373
2012/0051041 A1* 3/2012 Edmond ................. F21V 29/75 362/296.01
2012/0068615 A1* 3/2012 Duong ................... A01G 9/249 313/503
2012/0069575 A1* 3/2012 Koh ..................... G02B 6/0046 362/257
2012/0069579 A1* 3/2012 Koh ..................... G02B 6/0046 362/307
2012/0069595 A1* 3/2012 Catalano .............. G02B 6/0021 362/555
2012/0075870 A1* 3/2012 Kayanuma .............. F21V 5/045 362/333
2012/0113537 A1* 5/2012 Minano ..................... F21V 7/04 359/834
2012/0113676 A1* 5/2012 Van Dijk ............. G02B 6/0078 362/606
2012/0114284 A1* 5/2012 Ender .................. G02B 27/143 385/32
2012/0120651 A1* 5/2012 Peck ......................... F21S 4/28 362/249.02
2012/0140461 A1* 6/2012 Pickard ................. F21V 7/0091 362/225
2012/0152490 A1* 6/2012 Wen ........................ F21V 29/70 165/104.26
2012/0170266 A1* 7/2012 Germain ............... F21V 33/006 29/428
2012/0170316 A1* 7/2012 Lee ...................... G02B 6/0036 362/617
2012/0170318 A1* 7/2012 Tsai ..................... G02B 6/0021 362/630
2012/0182767 A1* 7/2012 Petcavich ............... G09F 13/18 359/599
2012/0188774 A1* 7/2012 Okada ................... F21S 43/241 362/299
2012/0212957 A1* 8/2012 Hyun .................. F21V 19/0045 362/241
2012/0230019 A1* 9/2012 Peifer ................... F21V 21/048 362/147
2012/0250296 A1* 10/2012 Lu ........................... F21S 8/046 362/147
2012/0250319 A1* 10/2012 Dau ........................ F21V 23/06 362/249.02
2012/0257383 A1* 10/2012 Zhang ....................... F21V 5/02 362/327
2012/0268931 A1* 10/2012 Lerman ................. F21V 19/005 362/249.02
2012/0268932 A1* 10/2012 Lerman ................ H05K 1/0204 362/249.02
2012/0287619 A1* 11/2012 Pickard ................... F21K 9/232 362/231
2012/0287654 A1* 11/2012 He ........................ F21V 21/116 362/431
2012/0287677 A1* 11/2012 Wheatley ............. G02B 6/0068 362/627
2012/0298181 A1* 11/2012 Cashion .............. H01L 31/0543 136/246
2012/0307496 A1* 12/2012 Phillips, III .............. F21V 5/04 257/E33.056
2012/0320626 A1* 12/2012 Quilici ................. G02B 6/0035 362/606
2012/0326614 A1* 12/2012 Tsuji ...................... H05B 45/10 315/200 R
2013/0003363 A1* 1/2013 Lu ........................... F21V 5/045 362/326
2013/0010464 A1* 1/2013 Shuja ...................... F21V 29/00 362/249.02
2013/0028557 A1* 1/2013 Lee ...................... G02B 6/2813 385/28
2013/0033867 A1* 2/2013 Coplin .................... F21V 13/04 362/373
2013/0037838 A1* 2/2013 Speier ..................... H01L 22/10 118/620
2013/0038219 A1* 2/2013 Dau ....................... H05B 45/59 315/297
2013/0039050 A1* 2/2013 Dau ...................... F21V 7/0033 362/217.05
2013/0044480 A1* 2/2013 Sato ........................ F21S 8/061 362/235
2013/0077298 A1* 3/2013 Steele ..................... F21V 13/14 362/249.06
2013/0088890 A1* 4/2013 Knapp ................. G02B 6/0038 362/609
2013/0107518 A1* 5/2013 Boyer ..................... F21V 15/01 362/235
2013/0107527 A1* 5/2013 Boyer ................... F21V 7/0083 362/241
2013/0107528 A1* 5/2013 Boyer ..................... F21S 8/033 362/243
2013/0107553 A1* 5/2013 Desai ..................... B64D 47/06 362/235
2013/0128593 A1* 5/2013 Luo ......................... F21V 25/00 362/362
2013/0155675 A1* 6/2013 Wassel .................... F21V 7/048 315/312
2013/0170210 A1* 7/2013 Athalye .................. F21V 29/51 362/249.02
2013/0194811 A1* 8/2013 Benitez ............. G02B 27/0961 362/311.1
2013/0201715 A1* 8/2013 Dau ...................... F21V 23/003 362/551
2013/0208461 A1* 8/2013 Warton ................. F21V 21/116 362/217.05
2013/0208495 A1* 8/2013 Dau ....................... G02B 1/045 362/551
2013/0214300 A1* 8/2013 Lerman ..................... F21K 9/64 257/88
2013/0215612 A1* 8/2013 Garcia .................... F21V 11/00 362/248
2013/0223057 A1* 8/2013 Gassner .................... F21V 3/04 362/223
2013/0229804 A1* 9/2013 Holder ............... G02B 19/0071 362/244
2013/0229810 A1* 9/2013 Pelka ................. G02B 19/0061 362/311.06
2013/0250584 A1* 9/2013 Wang .................. F21V 23/0464 362/362
2013/0279198 A1* 10/2013 Lin ...................... G02B 6/0011 362/616
2013/0286637 A1* 10/2013 Lay ........................... F21S 8/04 362/147
2013/0294059 A1* 11/2013 Galluccio ............. F21V 7/0008 362/217.05
2013/0294063 A1* 11/2013 Lou ........................... F21V 7/04 362/217.05
2013/0300310 A1* 11/2013 Hu ..................... H05B 45/3725 315/254
2013/0315833 A1* 11/2013 Julius ..................... G01N 33/58 424/9.2
2013/0343045 A1* 12/2013 Lodhie .................... F21V 23/02 362/249.02
2013/0343055 A1* 12/2013 Eckert ..................... F21V 31/03 362/362
2013/0343079 A1* 12/2013 Unger ..................... F21V 13/04 362/555
2014/0001507 A1* 1/2014 Streppel .................. F21V 5/045 359/619
2014/0003041 A1* 1/2014 Dau ........................ F21S 8/068 362/147
2014/0029257 A1* 1/2014 Boyer ..................... F21S 8/086 362/235
2014/0036510 A1* 2/2014 Preston ..................... F21V 5/00 362/296.01

(56) References Cited

U.S. PATENT DOCUMENTS

2014/0049961 A1* 2/2014 Wilcox .................. F21V 29/75 362/244
2014/0071687 A1* 3/2014 Tickner .................. F21V 21/04 362/382
2014/0110096 A1* 4/2014 Norberg .................... F21K 9/90 362/249.02
2014/0168955 A1* 6/2014 Gershaw ................. F21S 8/026 362/225
2014/0211457 A1* 7/2014 Tarsa ........................ F21K 9/61 362/147
2014/0211476 A1* 7/2014 Yuan .................... G02B 6/0036 385/39
2014/0211495 A1* 7/2014 Yuan .................... G02B 6/0035 362/555
2014/0211497 A1* 7/2014 Yuan ...................... G02B 6/002 362/555
2014/0211502 A1* 7/2014 Keller .................. G02B 6/0031 362/608
2014/0211504 A1* 7/2014 Yuan .................... G02B 6/0078 385/39
2014/0211508 A1* 7/2014 Yuan .................... G02B 6/0031 385/88
2014/0212090 A1* 7/2014 Wilcox ..................... F21K 9/23 385/27
2014/0226337 A1* 8/2014 Timmers ................. F21V 23/04 362/293
2014/0268879 A1* 9/2014 Mizuyama ........... G02B 6/0043 362/625
2014/0313727 A1* 10/2014 Dupre ..................... F21S 8/036 362/368
2014/0334126 A1* 11/2014 Speier ....................... F21V 5/04 362/307
2014/0347885 A1* 11/2014 Wilcox ................... F21S 8/061 362/612
2014/0355297 A1* 12/2014 Castillo ................. F21V 7/0091 362/582
2014/0355302 A1* 12/2014 Wilcox ............... F21V 23/0464 362/609
2015/0003059 A1* 1/2015 Haitz ................. G02B 19/0028 362/235
2015/0049507 A1* 2/2015 Shani ................... G02B 6/0061 362/609
2015/0055369 A1* 2/2015 Tarsa ................... G02B 6/0085 362/613
2015/0055371 A1* 2/2015 van de Ven .......... G02B 6/0078 362/612
2015/0109820 A1* 4/2015 Wilcox .................. G02B 6/262 385/47
2015/0160396 A1* 6/2015 Wilcox .................... G02B 6/32 362/555
2015/0168664 A1* 6/2015 Coenegracht ........ G02B 6/4446 385/135
2015/0253488 A1* 9/2015 Wilcox .................. G02B 6/305 362/619
2015/0345715 A1* 12/2015 Castillo ............... F21V 23/0464 362/373
2015/0354786 A1* 12/2015 Ji .......................... H05B 45/20 362/240
2016/0170164 A1* 6/2016 Pasek ..................... H02G 3/083 385/136
2016/0202441 A1* 7/2016 Claessens ............ G02B 6/4477 385/113
2016/0302281 A1* 10/2016 Wassel ................... H05B 47/16
2017/0010431 A1* 1/2017 Coenegracht ........ G02B 6/4446
2017/0030566 A1* 2/2017 Milam .................... F21V 21/14
2017/0059135 A1* 3/2017 Jones .................... F21V 29/763
2017/0108648 A1* 4/2017 Smith .................. G02B 6/4472
2017/0168221 A1* 6/2017 Wilcox .................... G02B 6/32
2017/0307204 A1* 10/2017 Cattoni .................. F21V 29/89
2018/0041018 A1* 2/2018 Thompson ........... H02G 15/013
2018/0196215 A1* 7/2018 Claessens ............ G02B 6/3897
2018/0252887 A1* 9/2018 Coenegracht ...... G02B 6/44465
2018/0254622 A1* 9/2018 Thompson ........... H05K 5/0004
2019/0162384 A1* 5/2019 Lowes .................... F21V 31/03
2019/0293888 A1* 9/2019 Bryon .................. G02B 6/4446
2021/0191057 A1* 6/2021 Liefsoens .............. G02B 6/445
2021/0199263 A1* 7/2021 Castillo ................... F21V 5/002
2021/0215898 A1* 7/2021 Claessens ............ G02B 6/4444
2021/0255409 A1* 8/2021 Geens .................. G02B 6/4444
2021/0373267 A1* 12/2021 Radelet ................ H02G 15/013
2021/0373271 A1* 12/2021 Geens .................. G02B 6/3825
2022/0196950 A1* 6/2022 Geens ................ G02B 6/44465
2022/0214514 A1* 7/2022 Geens .................. G02B 6/4473
2022/0337044 A1* 10/2022 Vastmans ........... G02B 6/44775
2023/0054905 A1* 2/2023 Liefsoens ............ G02B 6/4447
2023/0145954 A1* 5/2023 Allen ..................... H02G 3/263 248/49
2023/0151944 A1* 5/2023 Castillo ..................... F21V 3/02 385/27
2023/0161127 A1* 5/2023 Schurmans .......... H02G 15/013 385/135
2023/0299249 A1* 9/2023 Xiong ..................... H01L 33/60 257/91
2023/0417382 A1* 12/2023 Wilcox .................. G02B 6/002
2024/0117090 A1* 4/2024 Chae ................... C08F 220/325

* cited by examiner

LED LUMINAIRE WITH A CAVITY, FINNED INTERIOR, AND A CURVED OUTER WALL EXTENDING FROM A SURFACE ON WHICH THE LIGHT SOURCE IS MOUNTED

CROSS REFERENCE TO RELATED APPLICATIONS

The present application is a continuation of U.S. patent application Ser. No. 17/185,335, filed Feb. 25, 2021, which is a division of U.S. patent application Ser. No. 14/618,884, filed Feb. 10, 2015, now U.S. Pat. No. 10,935,211, which claims benefit of Provisional Application No. 62/009,039, filed Jun. 6, 2014 and Provisional Application No. 62/005,955, filed May 30, 2014, and is a continuation-in-part of U.S. patent application Ser. No. 14/583,415, filed Dec. 26, 2014, now U.S. Pat. No. 10,502,899, which is a continuation-in-part of U.S. patent application Ser. No. 14/462,322, filed Aug. 18, 2014, now U.S. Pat. No. 9,632,295, which is a continuation-in-part of U.S. patent application Ser. No. 14/462,426, filed Aug. 18, 2014, now U.S. Pat. No. 10,379,278, which is a continuation-in-part of U.S. patent application Ser. No. 14/462,391, filed Aug. 18, 2014, now U.S. Pat. No. 9,513,424, all owned by the assignee of the present application, and the disclosures of which are incorporated by reference herein.

FIELD OF THE INVENTION

The present subject matter relates to general illumination lighting, and more particularly, to an optic used to collimate light rays generated by light emitting diodes.

BACKGROUND OF THE INVENTION

Large areas of open space, such as a farm stead, a parking lot or deck of a parking garage, or a roadway, require sufficient lighting to allow for safe travel of vehicles and persons through the space at all times including periods of reduced natural lighting, such as nighttime, rainy, or foggy weather conditions. A luminaire for rural areas, an outdoor parking lot or covered parking deck, a roadway, etc. must illuminate a large area of space in the vicinity of the luminaire while controlling glare so as not to distract drivers. In some applications such as roadway, street, or parking lot lighting, it may be desirable to illuminate certain regions surrounding a light fixture while maintaining relatively low illumination of neighboring regions thereof. For example, along a roadway, it may be preferred to direct light in a lateral direction parallel with the roadway while minimizing illumination in a longitudinal direction toward roadside houses or other buildings. Still further, such a luminaire should be universal in the sense that the luminaire can be mounted in various enclosed and non-enclosed locations, on poles or on a surface (such as a garage ceiling), and preferably present a uniform appearance.

Advances in light emitting diode (LED) technology have resulted in wide adoption of luminaires that incorporate such devices. While LEDs can be used alone to produce light without the need for supplementary optical devices, it has been found that optical modifiers, such as lenses, reflectors, optical waveguides, and combinations thereof, can significantly improve illumination distribution for particular applications. Improved consistency in the manufacture of LEDs along with improvements in the utilization of mounting structures to act as heat sinks have resulted in luminaires that are economically competitive and operationally superior to the conventional incandescent and fluorescent lighting that has been the staple of the industry for decades. As the use of LEDs has matured from their use in warning and other signals to general lighting fixtures, it has become necessary to develop optics that allow for the dispersion of the harsh, intensely concentrated beam of light emitted by the LED into a softer, more comfortable illumination that presents a uniform and even appearance.

One way of attaining a more uniform appearance is to control the light rays generated by the LEDs so as to redirect the light rays through and/or out of an optic so that the light presents a uniform appearance when it exits the optic. Redirecting light through the optic can be accomplished through the use of refractive surfaces at a refractive index interface.

SUMMARY OF THE INVENTION

According to one embodiment, an optical member includes an enclosure comprising an optically transmissive material. The enclosure has an outer surface and an inner surface opposite the outer surface. At least one light redirection feature protrudes from the inner surface. At least one indentation defined on the outer surface is configured to refract light.

According to another aspect, an optical member includes a base, a curved surface extending from the base and including an outer surface, an inner surface opposite the outer surface, and a plurality of light redirection features disposed on the inner surface. An LED package comprising a plurality of dies enclosed in a single encapsulant.

According to a further aspect, a lighting device includes a housing and a light source. The housing comprises a base, a plurality of fins extending between a central wall and an outer wall on a first surface of the base, and a cavity extending between an outer edge of the first surface and the outer wall. The light source is mounted to the second surface of the base.

According to another aspect, a lighting device includes a housing and a cover adapted to be disposed on the housing comprising a prong at a first end and a tab at a second end opposite the first end. The housing includes an opening configured to receive the prong of the cover and a ledge configured to receive the tab such that the cover is secured to the housing.

Other aspects and advantages of the present invention will become apparent upon consideration of the following detailed description and the attached drawings wherein like numerals designate like structures throughout the specification.

DETAILED DESCRIPTION

Figure 1:
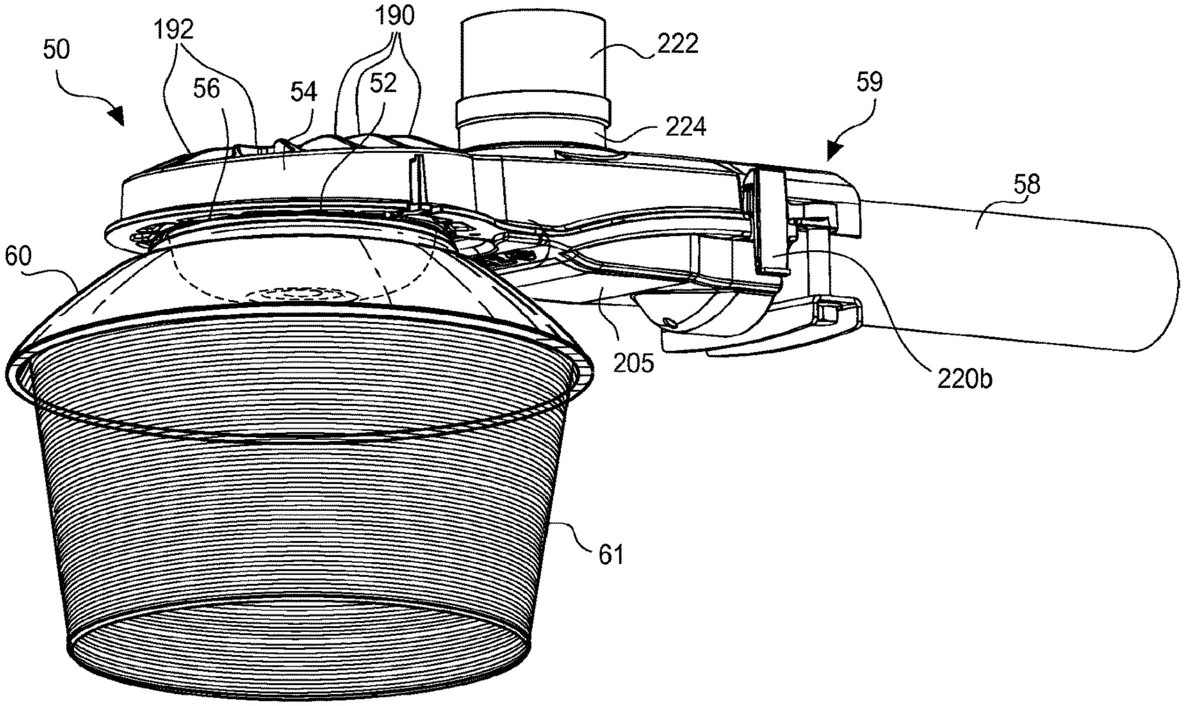
FIG. 1 is an isometric view taken from below of a luminaire incorporating an optical member.
Figure 1A:
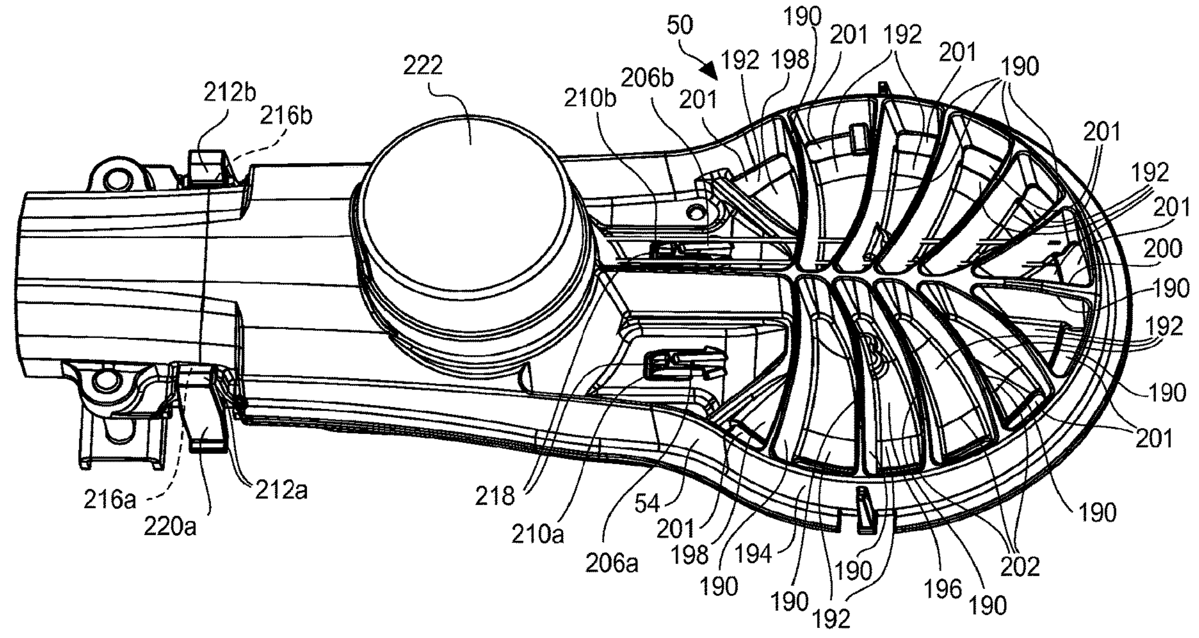
FIG. 1A is an isometric view taken from above of the luminaire of FIG. 1.
Figure 2:
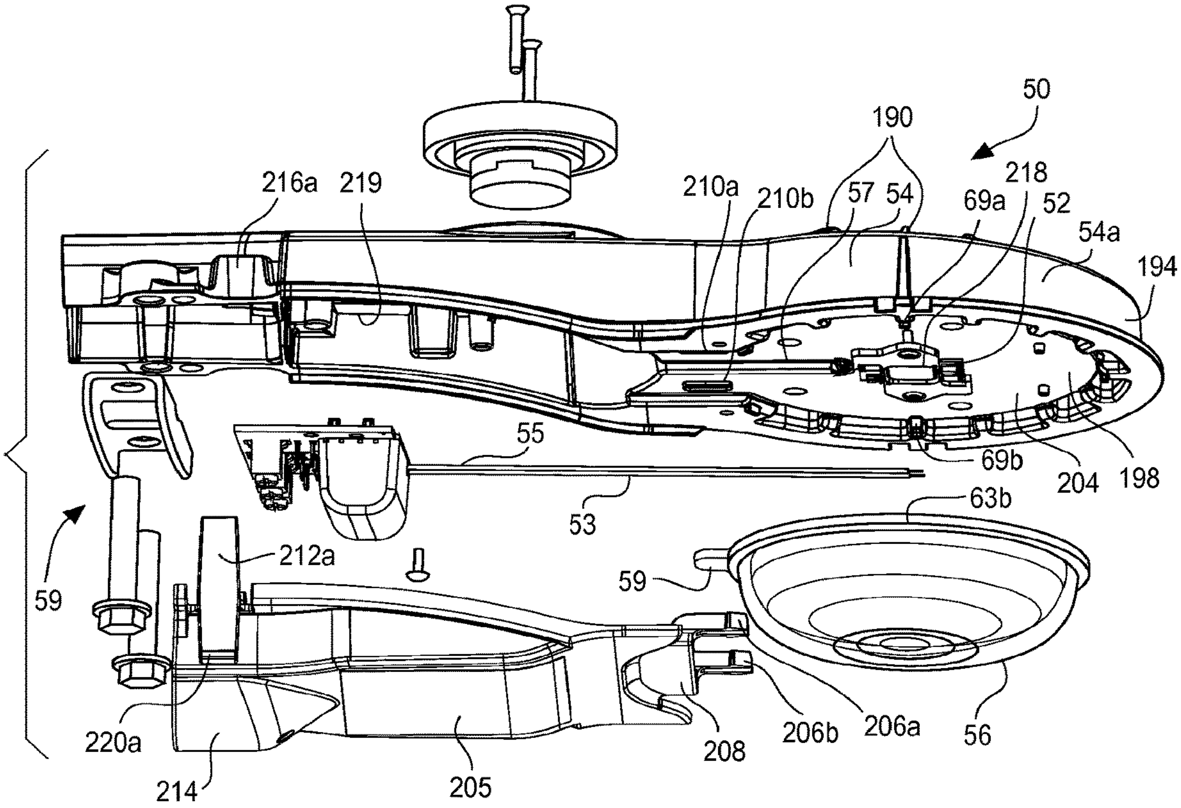
FIG. 2 is an exploded isometric view taken from below of a luminaire incorporating an optical member.

Disclosed herein is luminaire 50 for general lighting, such as illumination of an open or large enclosed space, for example, in a rural setting, a roadway, a parking lot or structure, or the like. Referring to FIGS. 1, 1A, and 2, the luminaire 50 includes a light source such as one or more LED element(s) or module(s) 52 disposed in a housing 54 having a transparent optical member 56 and a cover 205 secured thereto. The luminaire 50 is adapted to be mounted on a device or structure, for example, on an outdoor pole or stanchion 58 and retained thereon by a clamping apparatus 59. The luminaire 50 may further include an optional reflector 60 and/or an optional shroud 61 secured in any suitable fashion about the optical member 56. The luminaire 50 may also include an ambient light sensor 222 mounted in a receptable 224 that acts as a switch such that, when the level of ambient light drops below a predetermined threshold, an electrical path is established by the sensor 222 thereby causing the luminaire 50 to illuminate.

Each LED element or module 52 may be a single white or other color LED chip or other bare component, or each may comprise multiple LEDs either mounted separately or together on a single substrate or package to form a module including, for example, at least one phosphor-coated LED either alone or in combination with at least one color LED, such as a green LED, a yellow LED, a red LED, etc. In those cases where a soft white illumination with improved color rendering is to be produced, each LED element or module 52 or a plurality of such elements or modules 52 may include one or more blue shifted yellow LEDs and one or more red LEDs. The LEDs may be disposed in different configurations and/or layouts as desired. Different color temperatures and appearances could be produced using other LED combinations, as is known in the art. In one embodiment, each element or module comprises any LED, for example, an MT-G LED incorporating TrueWhite® LED technology or as disclosed in U.S. patent application Ser. No. 13/649,067, filed Oct. 10, 2012, entitled "LED Package with Multiple Element Light Source and Encapsulant Having Planar Surfaces" by Lowes et al., the disclosure of which is hereby incorporated by reference herein, as developed and manufactured by Cree, Inc., the assignee of the present application. If desirable, a side emitting LED disclosed in U.S. Pat. No. 8,541,795, filed Oct. 10, 2005, entitled "Side-Emitting Optical Coupling Device" by Keller et al., the disclosure of which is incorporated by reference herein, as developed and manufactured by Cree, Inc., the assignee of the present application, may be utilized. In some embodiments, each LED element or module 52 may comprise one or more LEDs disposed within a coupling cavity with an air gap being disposed between the LED element or module 52 and a light input surface. In any of the embodiments disclosed herein each of the LED element(s) or module(s) 52 preferably have a lambertian or near-lambertian light distribution, although each may have a directional emission distribution (e.g., a side emitting distribution), as necessary or desirable. More generally, any lambertian, symmetric, wide angle, preferential-sided, or asymmetric beam pattern LED element(s) or module(s) may be used as the light source.

Figure 2A:
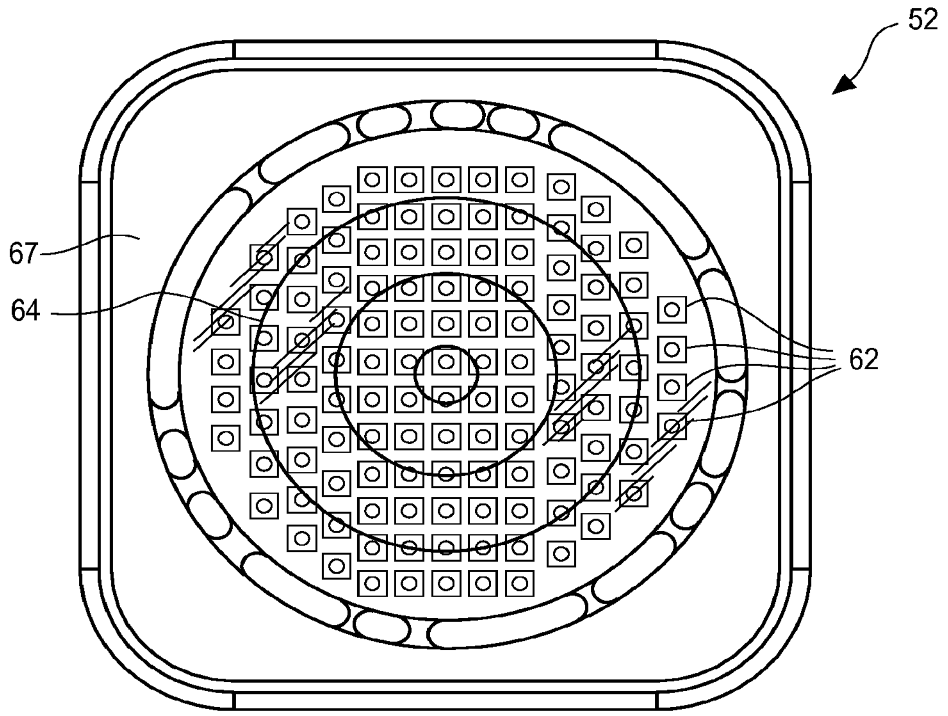
FIG. 2A is a bottom elevational view of an LED element or module.

In one embodiment, the LED package or element 52 may comprise a multi-die LED package, as shown in FIG. 2A. The multi-die package includes at least 40 dies 62 disposed under a single encapsulant or other primary optic 64 on a circuit board 67. In other embodiments, the multi-die package may include 80 dies, or 120 dies, or any number of dies as desired. The optical member 56 may be used with a relatively large LED package having a diameter from about 12.5 mm to about 30 mm, preferably from about 17.5 mm to about 25 mm. In one embodiment, the lighting device 50 may include a module or element as disclosed in U.S. Patent Application 62/088,375, filed Dec. 5, 2014, entitled "Voltage Configurable Solid State Lighting Apparatuses, Systems, and Related Methods", the disclosure of which is hereby incorporated by reference herein, as developed and manufactured by Cree, Inc., the assignee of the present application. In other embodiments, the LED package may include a plurality of individual LED dies wherein each die has an associated encapsulant. The electrical components of the luminaire 50 are described in greater detail in copending U.S. patent application Ser. No. 14/618,819, entitled "LED Luminaire," filed contemporaneously herewith, owned by the assignee of the present application and the disclosure of which is hereby incorporated by reference herein.

Referring to FIGS. 1, 1A, and 2, the housing 54 includes a plurality of tapered fins 190, a plurality of cavities 192 adjacent and between the fins 190, and an outer wall 194 surrounding the fins 190 and the cavities 192 to provide thermal management of the LED element or module 52. Specifically, the outer wall 194 of the housing 54 is disposed about and at least partially surrounds a first surface 196 of a base 198 (seen in FIG. 2). Each fin 190 extends between a tapered central wall 200 and the outer wall 194. Each cavity 192 extends into an associated space 201 between an outer edge 202 of the first surface 196 and the outer wall 194 and between adjacent fins 190. Each space 201 comprises a void or flow through channel that allows convective air flow therethrough for cooling purposes, and further allows fluid flow to drain rainwater. The first surface 196 slopes to the outer edge 202 such that a thickness of the base 198 near the central wall 200 is greater than a thickness of the base 198 near the outer edge 202 thereof to promote water drainage. The LED element or module 52 is mounted on a second surface 204 of the base 198 opposite the first surface 196. During operation, heat is dissipated as air flow carries heat produced by the LED element or module 52 through the spaces 20 land cavities 192 and along the surfaces of the fins 190, the outer wall 194, and the central wall 200. Other heat dissipation means may also be used.

While ten fins 190 are shown as curved and extending from a substantially linear central wall 200 and the outer wall 194 is shown as being substantially circular in shape, this need not be the case. Thus, for example, fewer or more than ten fins might be used, two or more central walls might be included, or the central wall 200 may be partially or entirely omitted. Alternatively or additionally, some or all of the fins 190 may be linear or be of another shape, the central wall 200 may be curved or some other shape, the outer wall 194 may be square or rectangular or some other shape, and/or the sizes and/or shapes of the cavities and/or the spaces 201 may be varied, as desired. One or more of the fins 190, the outer wall 194, and/or the base 198 may be continuous or discontinuous. Preferably, the fins 190, the outer wall 194, the base 198, and the other elements of the housing 154 are made of uncoated aluminum or another suitable material and are integrally formed.

In the embodiment illustrated in FIGS. 1 and 2, the cover 205 attaches to the housing 54 without the need for separate fastening components. As shown in FIG. 2, first and second prongs 206*a*, 206*b* extending from a first end 208 of the cover 205 are received by first and second openings 210*a*, 210*b* in the housing 54. First and second tabs 212*a*, 212*b* extending from a second end 214 of the cover 205 opposite the first end 208 includes first and second protrustions 213*a*, 213*b*, respectively, that snap-fit about respective first and second ledges 216*a*, 216*b* of the housing 54. During assembly and installation, the first and second prongs 206, 206*b* of the cover 205 are inserted into the first and second openings 210*a*, 210*b* of the housing 54 and the cover is allowed to hang freely from the prongs 206 and yet be movable about an axis of rotation 218. Thereafter, wires may be attached to components in a compartment 219 (seen in FIG. 2) as the cover 205 is hanging freely from the housing 54. Once connections have been made, the cover 205 may be pivoted about the axis of rotation 218 until the first and second tabs 212*a*, 212*b* of the cover 205 snap over the first and second ledges 216*a*, 216*b* of the housing 54. To remove the cover 205, first and second surfaces 220*a*, 220*b* opposite first and second tabs 212*a*, 212*b*, respectively, may be pushed together such that the first and second tabs 212*a*, 212*b* are moved from interfering relationship with the first and second ledges 216*a*, 216*b* of the housing 54 and the cover 205 may be pivoted about the point of rotation 218. In other embodiments, additional fastening components such as screws and/or pins may be used to secure the cover 205 to the housing 54.

Figure 3:
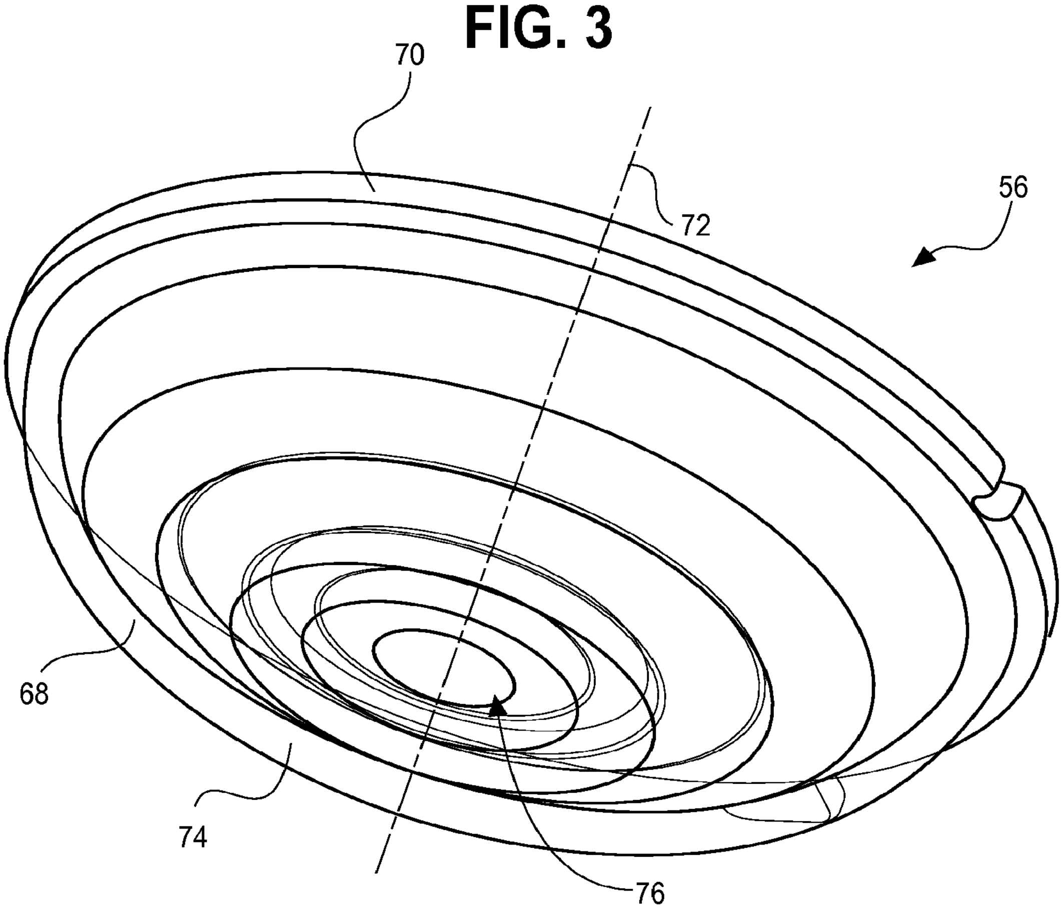
FIG. 3 is an isometric view from below of an embodiment of an optic.

Referring to FIG. 2, the optical member or enclosure 56 is disposed about the LED package(s) or element(s) 52 to produce a desired light distribution having a desired lumen output level. In the embodiment shown in FIG. 3, the optical member 56 comprises a curved portion 68 extending from a base 70. The curved portion 68 is symmetric about a central axis 72. An outer surface 74 of the curved portion 68 includes at least one indentation 76 configured to refract light away from the central axis 72. More specifically, the outer surface 74 is defined by a first portion 77 (FIG. 7) having a frustoconical shape and a second portion 79 (FIG. 7) defining a "free form" or "spline curvature." "Spline curvature" refers to the design of a surface having varied curvature to enable greater control over the angles and/or spread of the light rays as the rays strike the surface. In other embodiments, the outer surface may by defined by a specific equation, a curve determined by iteratively plotting the points using a differential or quasi-differential equation, and/or a free form curve derived by any methodology, such as empirically, or a combination thereof. The indentation 76 of the illustrated embodiment is defined by first, second, and third planar surfaces 78, 80, 82 (FIGS. 5 and 8) that approximate a curve 84 (FIG. 8). Each planar surface 78, 80, 82 (FIGS. 5 and 8) has a frustoconical shape concentric about the central axis 72. In some embodiments, the indentation 76 may comprise a planar surface, a curved surface, a free form surface, or a combination thereof. In the illustrated embodiment, the slope of the outer surface 74 varies smoothly (in that the change in slope is gradual or minor relative to distance), although discrete light extraction and/or redirection features (including discontinuous features) may be formed thereon as desired to produce a desired light distribution.

Figure 4:
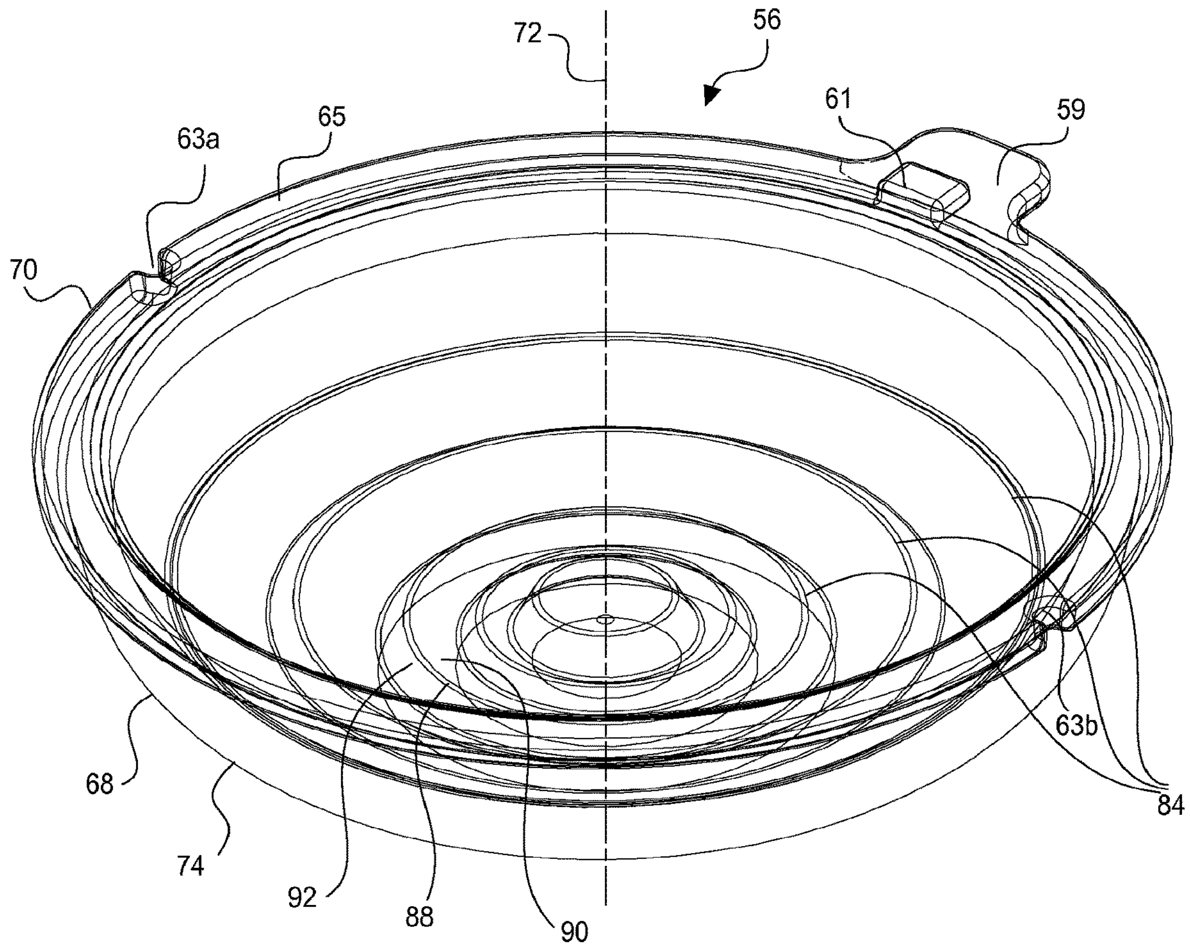
FIG. 4 is an isometric view from above of the embodiment of FIG. 3.
Figure 6:
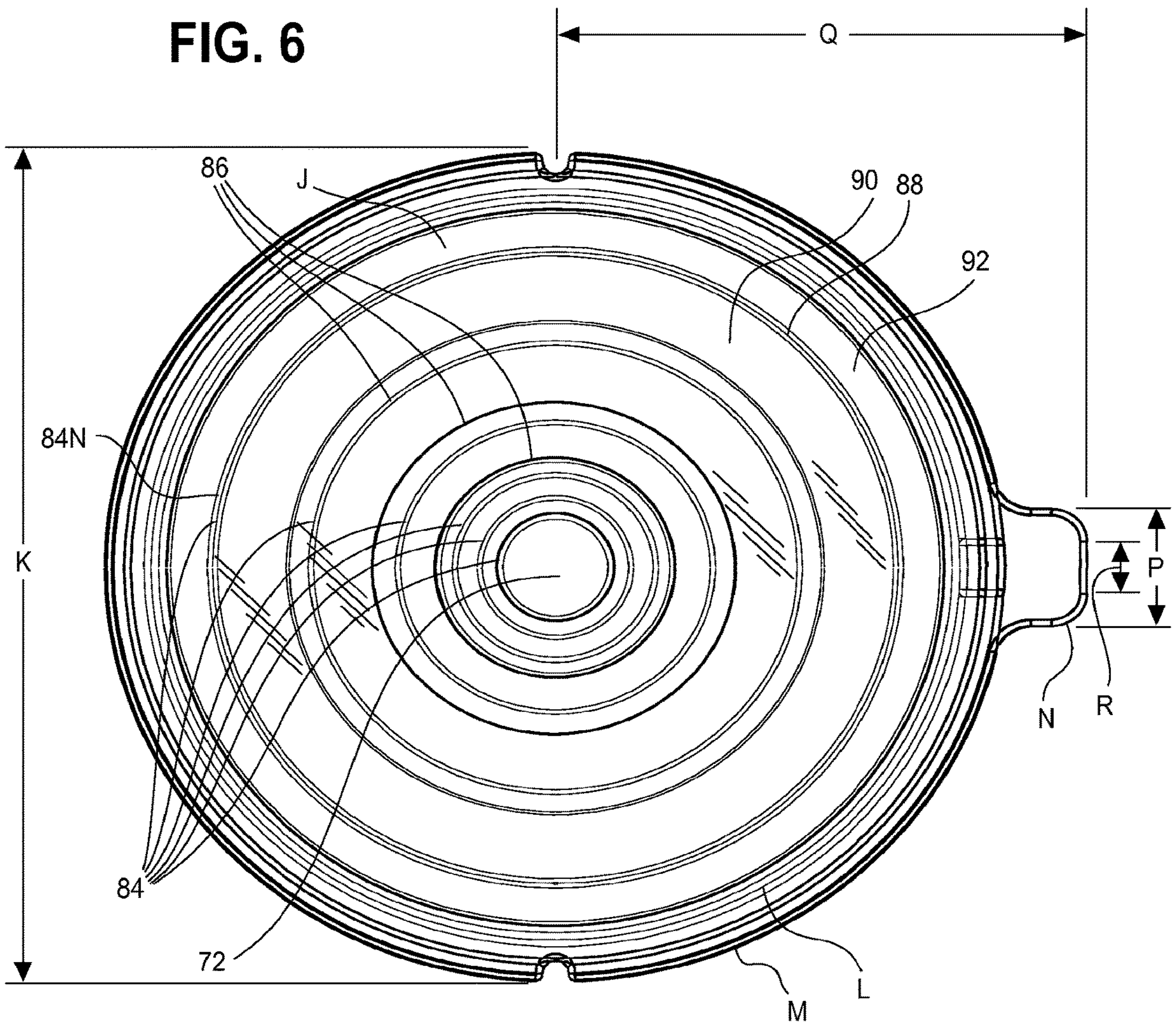
FIG. 6 is a plan view of the embodiment of FIG. 3.

Referring to FIGS. 4 and 6, the optical member 56 includes a plurality of light redirection features 84, each having an annular shape that is also concentric about the central axis 72, protruding from an inner surface 86 of the curved portion 68 opposite the outer surface 74, Further, the inner surface 86 is preferably symmetric about the central axis 72. In other embodiments, each redirection feature and/or the inner surface 86 may have an annular shape that is concentric about an axis other than the central axis 72, and/or the optical member 56 may include at least one light redirection feature 84 having a rounded or planar shape, or a plurality of discrete light direction features approximating an annular shape. Still further, the light redirection features may have other shapes, including shapes that extend fully or partially about a center or other point or feature, and/or shapes that are symmetric or asymmetric, smooth or discontinuous, one or more shapes defined by a specific equation, a shape determined by iteratively plotting points using a differential or quasi-differential equation, and/or a free form shape derived by any methodology, such as empirically, or a combination thereof, etc. Further, in some embodiments, adjacent light redirection features 84 distal to the central axis 72 may be spaced farther apart than adjacent light features 84 proximal to the central axis 72. In other embodiments, adjacent light redirection features 84 distal to the indentation 76 may be spaced farther apart than adjacent light features 84 proximal to the indentation 76.

The optical member 56 substantially redirects the primarily Lambertian distribution of light developed by the LED package 52. Each light redirection feature 84 of the embodiment illustrated in FIGS. 6 and 7 has a ridge-shape configured to retract light in this regard. The ridge-shape of the light redirection features shown in FIGS. 6 and 7 each include a ridge 88 defined by an inner feature surface 90 closer to the central axis 72 and an outer feature surface 92. The light developed by the LED package 52 is incident on the light redirection features 84 and may be retracted toward the outer surface 74 so that the light passes through the optical member 56 to the outer surface 74 where the light exits the optical member 56, The outer surface 74 may be domed and comprise an in indentation 76 configured to further refract the light (e.g., away from the central axis 72) upon exiting the optical member 56. The ridge 88 may be filleted as seen in cross section having a radius of curvature of less than about 1.0 mm, preferably less than 0.75 mm, and most preferably less than 0.5 mm. As seen in FIG. 8, the inner feature surface may have a finite radius of curvature along a first extent 94 between the inner surface 86 and the ridge 88. The outer feature surface 92 may be planar along a second extent 96 between the inner surface 86 and the ridge 88. The first and second extents 94, 96 may have a curved surface, a planar surface, and/or a combination thereof, and the curvature may vary from one light redirection feature 84 to another. A portion 98 of the inner surface 86 that extends between the outermost light redirection feature 84 and the base 70 may have a finite radius of curvature.

During assembly of the luminaire 20, the circuit board 67 of the LED package 52 is mounted by any suitable means, such as a bracket with fasteners and/or an adhesive material, for example, a UV curable silicone adhesive, on the second surface 204 of the housing 54, and the optical member 56 is secured to the housing 54 about the LED package 52 by any suitable means, such as a UV curable silicone adhesive or other adhesive. As seen in FIG. 2, wires 53 extend along and inside a channel 57 formed in the housing 54 and connect the LED package 52 to a further circuit board 55 located outside of the optical member 56 and disposed inside a housing 54 of the luminaire 50. The optical member 56 includes a tab 59 outwardly extending from the base 70 that is positioned over the wires 53 disposed in the channel 57. Referring to FIG. 4, a stub 61 extending from the base 70 adjacent the tab 59 applies pressure to the wires 53 in the channel 57 when the luminaire 50 is assembled. The tab 59 and stub 61 protect the wires 53 and channel 57 from elements such as water. Two locating slots 63*a*, 63*b*, each having a semi-circular cylindrical shape, are disposed along an outer edge 65 of the base 70 opposite to one another and equidistant from the tab 59. The locating slots 63*a*, 63*b* receive protrusions 69*a*, 69*b* (FIG. 2) extending from the second surface 204 of the housing 54. An adhesive material such as a UV curable silicone adhesive disposed on the second surface 2014 of the housing 54 secures the optical member 56 thereto.

The material(s) of the optical member 56 preferably comprises optical grade materials that exhibit refractive characteristics such as glass and/or polycarbonate, although other materials such as acrylic, air, molded silicone, and/or cyclic olefin copolymers, and combinations thereof, may be used. Further, the materials may be provided in a layered arrangement to achieve a desired effect and/or appearance. Preferably, although not necessarily, the optical member 56 is solid, although the optical member 56 may have one or more voids or discrete bodies of differing materials therein. The optical member 56 may be fabricated using procedures such as molding, including glass and/or injection/compression molding, or hot embossing, although other manufacturing methods such may be used as desired. In one embodiment, the optical member 56 comprises glass and is manufactured using glass molding techniques.

Figure 5:
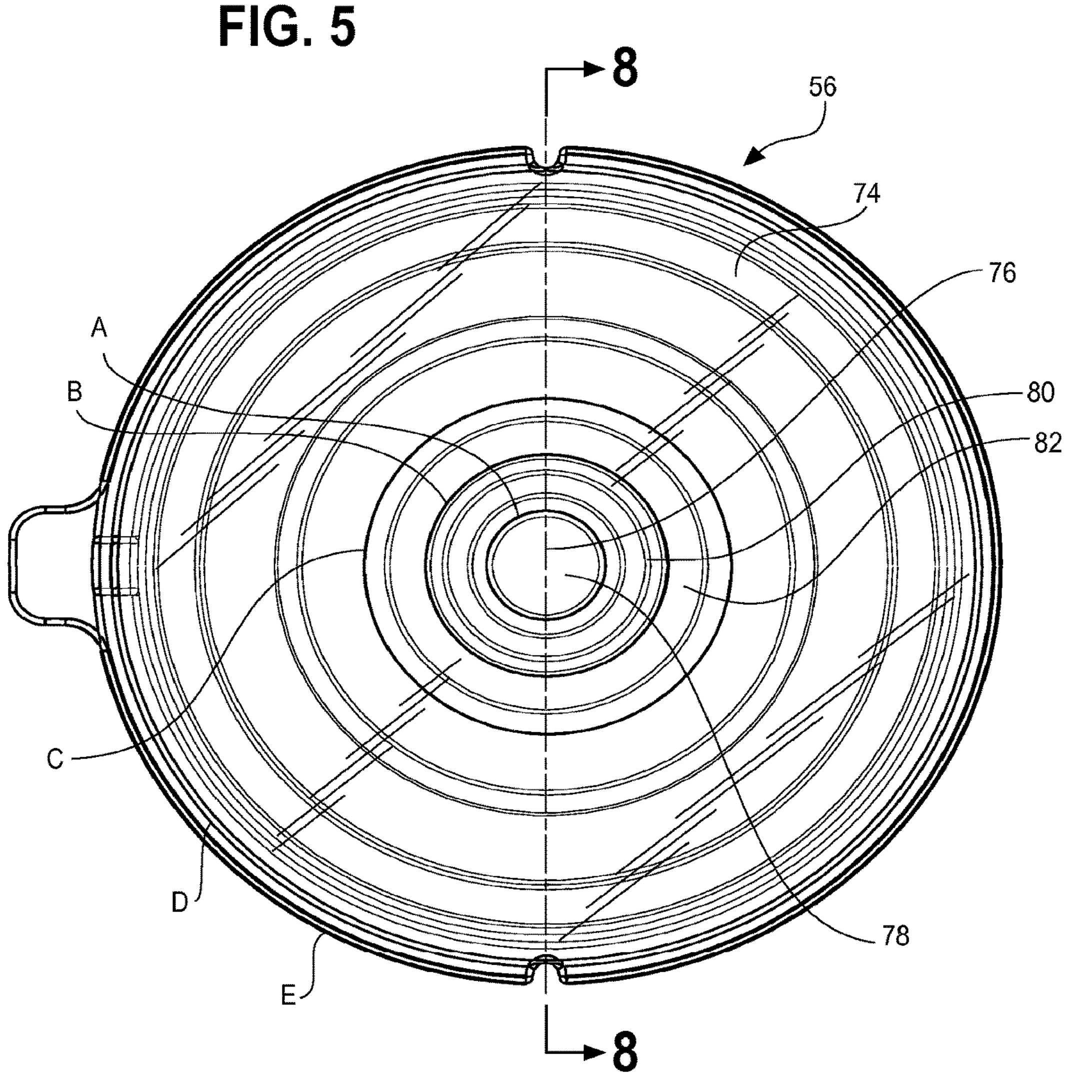
FIG. 5 is a bottom elevational view of the embodiment of FIG. 3.
Figure 7:
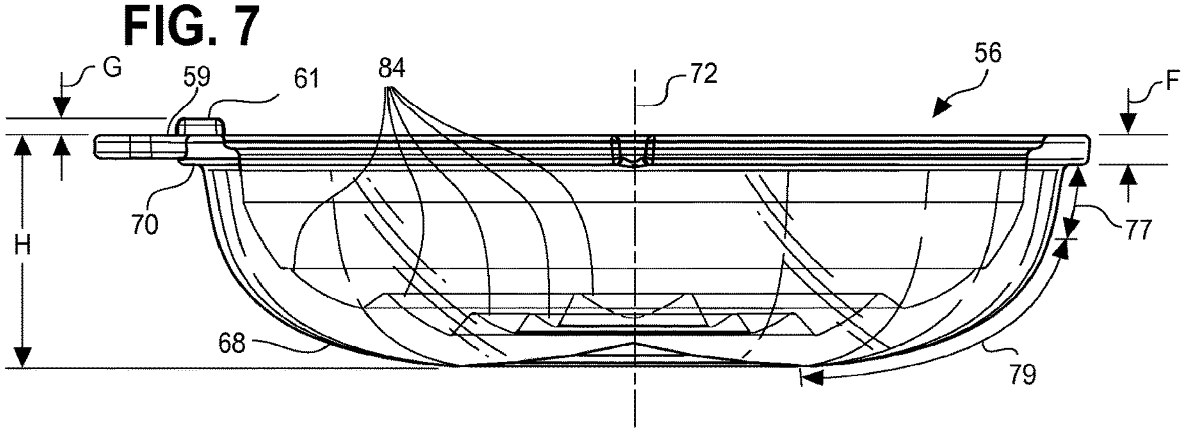
FIG. 7 is a side elevational view of the embodiment of FIG. 3.
Figure 8:
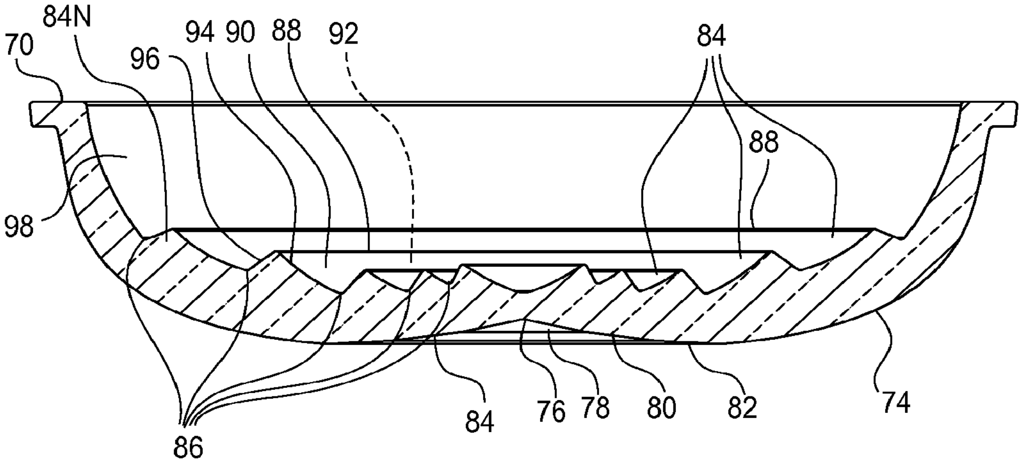
FIG. 8 is a sectional view taken generally along the lines of 8-8 of FIG. 5.
Figure 8A:
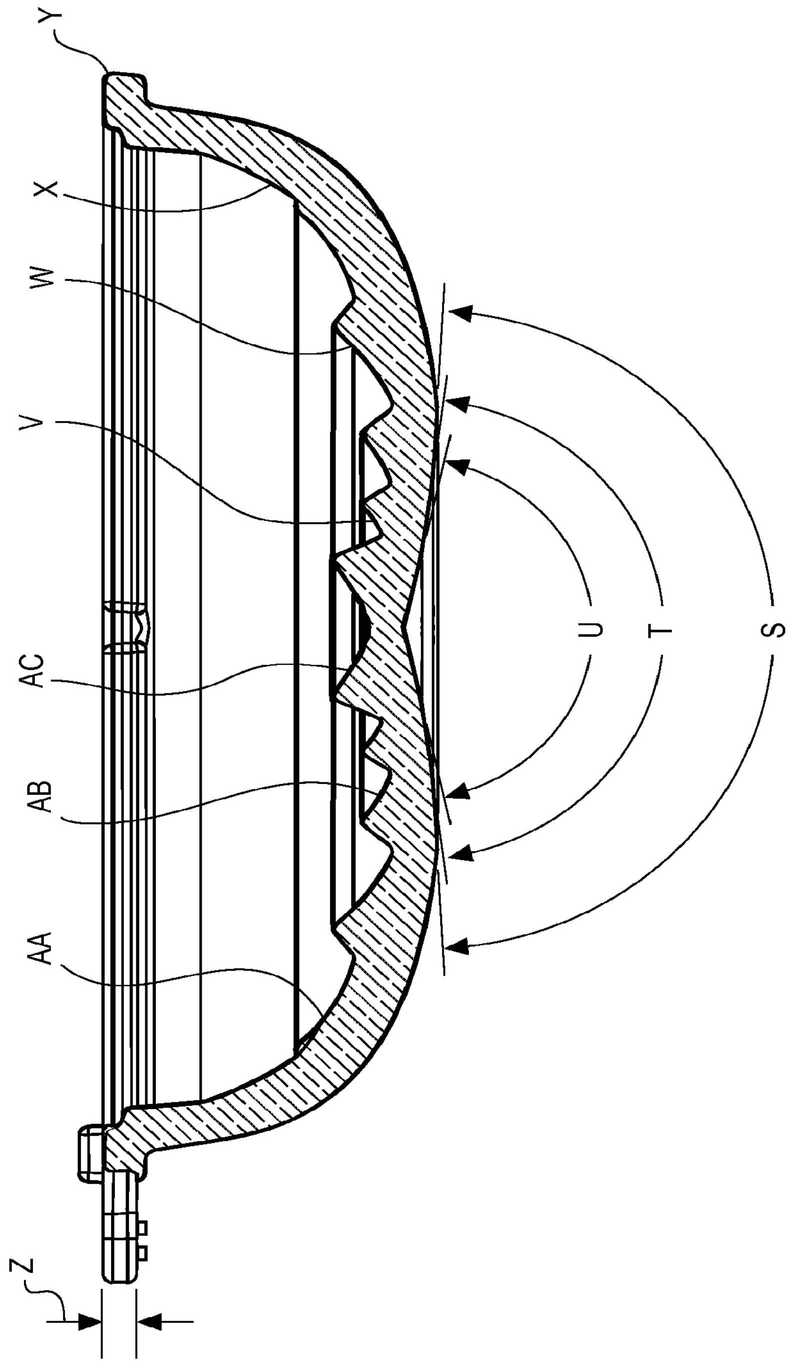
FIGS. 8A and 8B are sectional views identical to FIG. 8 illustrating sample dimensions for the optical member.
Figure 8B:
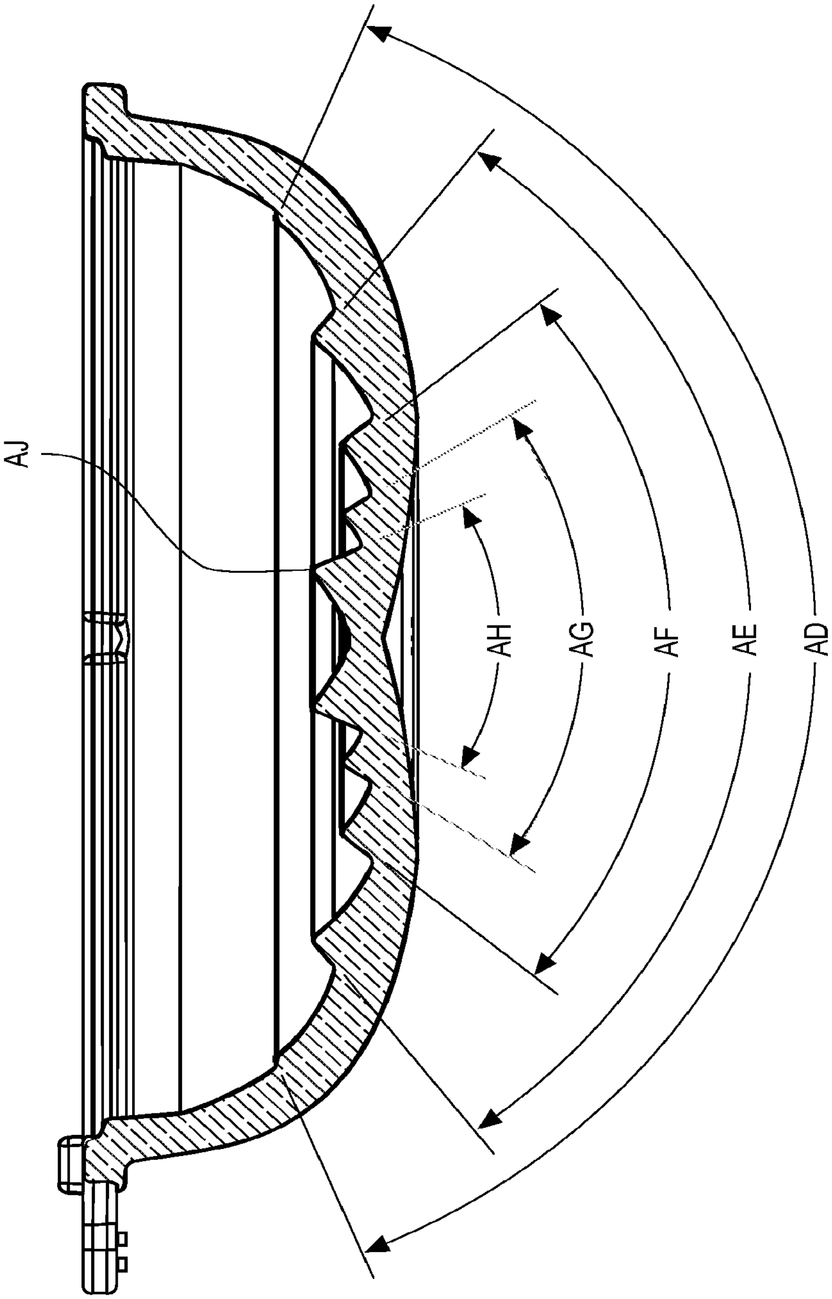
Figure 9:
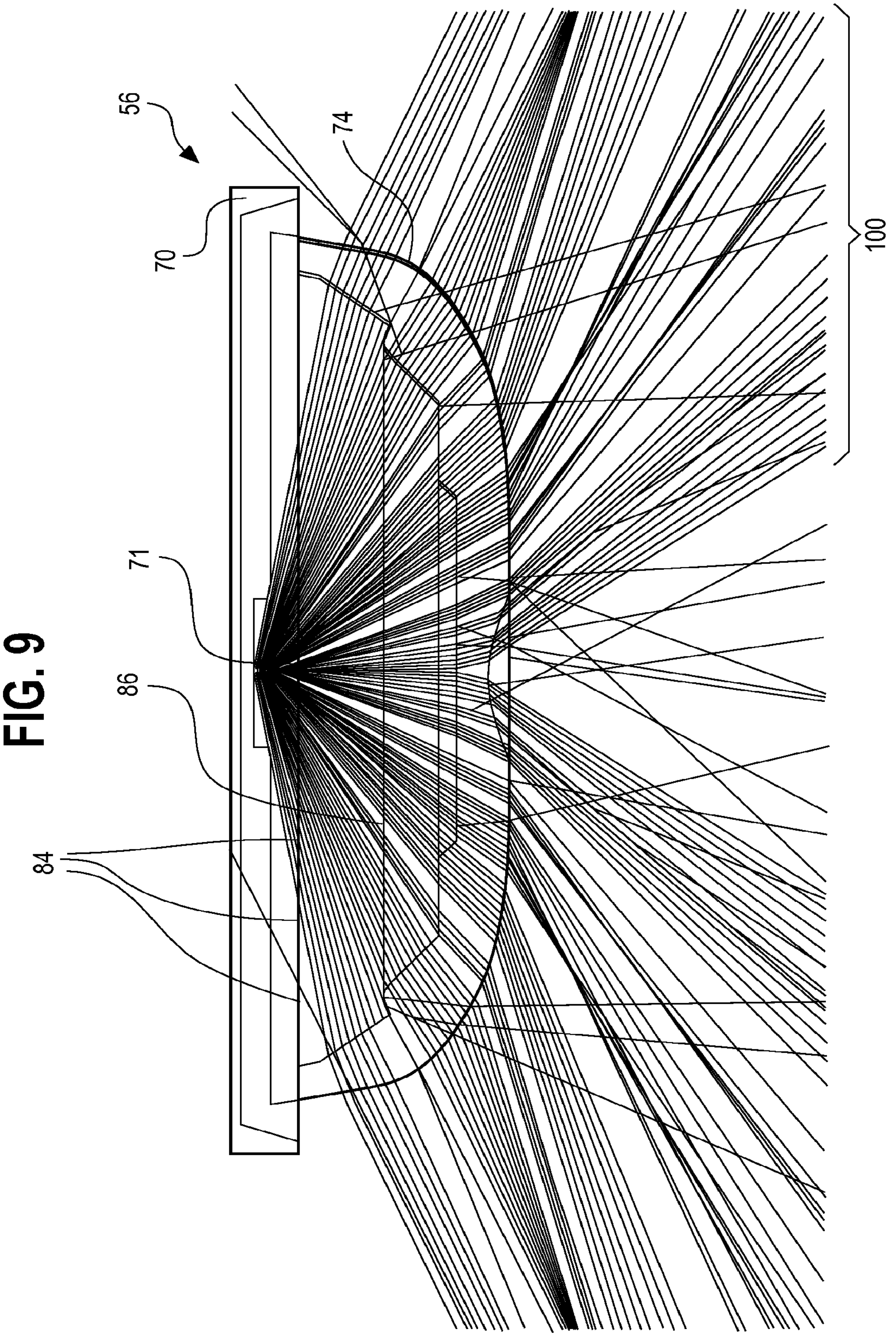
FIG. 9 is a light ray diagram of a further embodiment of an optic.

The light developed by the LED package 52 is incident on the light redirection features 84 and is collimated to some degree and redirected outwardly and away from the central axis 72. As shown by the rays 100 of FIG. 9, the light incident on the redirection features 84 is refracted at the inner surface 86 of the curved portion 68 and refracted again at the outer surface 74 of the curved portion 68. The degree of redirection is determined by a number of factors, including the curvature and shape of the redirection feature(s) 84 and the surfaces 78, 80, 82 that define the indentation 76. In the illustrated embodiment shown in FIGS. 8A and 8B, each optical member has the dimensions recited in the following table, it being understood that the dimensions are exemplary only and do not limit the scope of any claims herein, except as may be recited thereby, together with equivalents thereof:

| REFERENCE | NOMINAL DIMENSIONS (in., unless otherwise specified) |
|---|---|
| FIG. 5 | |
| A | 0.66 (radius of curvature) |
| B | 1.33 (radius of curvature) |
| c | 2.00 (radius of curvature) |
| D | 4.8 (radius of curvature) |
| E | 4.98 (radius of curvature) |
| FIG. 7 | |
| F | 0.2 |
| G | 0.1 |
| H | 1.4 |
| FIG. 6 | |
| J | 0.122 (radius of curvature) |
| K | 4.94 |
| L | 2.24 (radius of curvature) |
| M | 2.49 (radius of curvature) |
| N | 0.20 (radius of curvature) |
| P | 0.669 |
| Q | 2.94 |
| R | 0.35 |
| FIG. 8A | |
| S | 173.0 degrees |
| T | 165.0 degrees |
| U | 155.0 degrees |
| V | 0.38 (radius of curvature) |
| W | 1.00 (radius of curvature) |
| X | 1.50 (radius of curvature) |
| Y | 0.04 (radius of curvature) |
| Z | 0.18 |
| AA | 0.75 (radius of curvature) |
| AB | 0.63 (radius of curvature) |
| AC | 1.00 (radius of curvature) |
| FIG. 8B | |
| AD | 135.0 +/− 2.5 degrees |
| AE | 105.0 +/− 2.5 degrees |
| AF | 80.0 +/− 2.5 degrees |
| AG | 65.2.0 +/− 2.5 degrees |
| AH | 50.0 +/− 2.5 degrees |
| AJ | 0.02 +/− 0.25 (radius of curvature) |

The optical member 56 has a thickness defined by the inner and outer surfaces 86, 74 that varies. The thickness may range from about 3 mm to about 6 mm, preferably from 3.25 mm to about 5.5 mm, and most preferably from about 3.25 mm to about 5 mm. In some embodiments, the thickness of the curved portion 68 may vary from about 3.7 mm at the indentation 76 to about 4.5 mm at the base 70. Further, the thickness of the optical member 56 at the light redirection features 84 may range from about 0.26 in. (6.604 mm) to about 0.37 in. (9.398 mm). The curved portion 68 may have a first thickness adjacent to the indentation 76 and a second thickness greater than the first thickness adjacent to the light redirection feature 84. The optical member 56 illustrated in FIGS. 3-8 may exhibit an optical efficiency of at least about 75%, preferably at least about 80%, and most preferably at least ab out 93%.

Figure 10A:
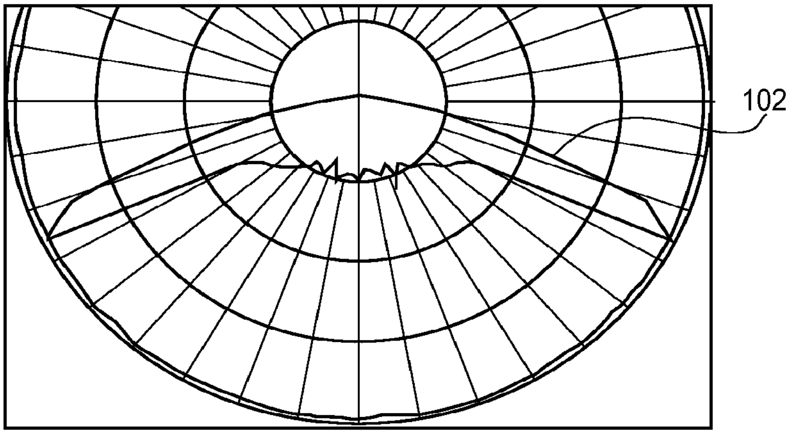
FIGS. 10A and 10B are side elevation and plan views, respectively, of illumination distributions produced by the embodiment of FIG. 3.
Figure 10B:
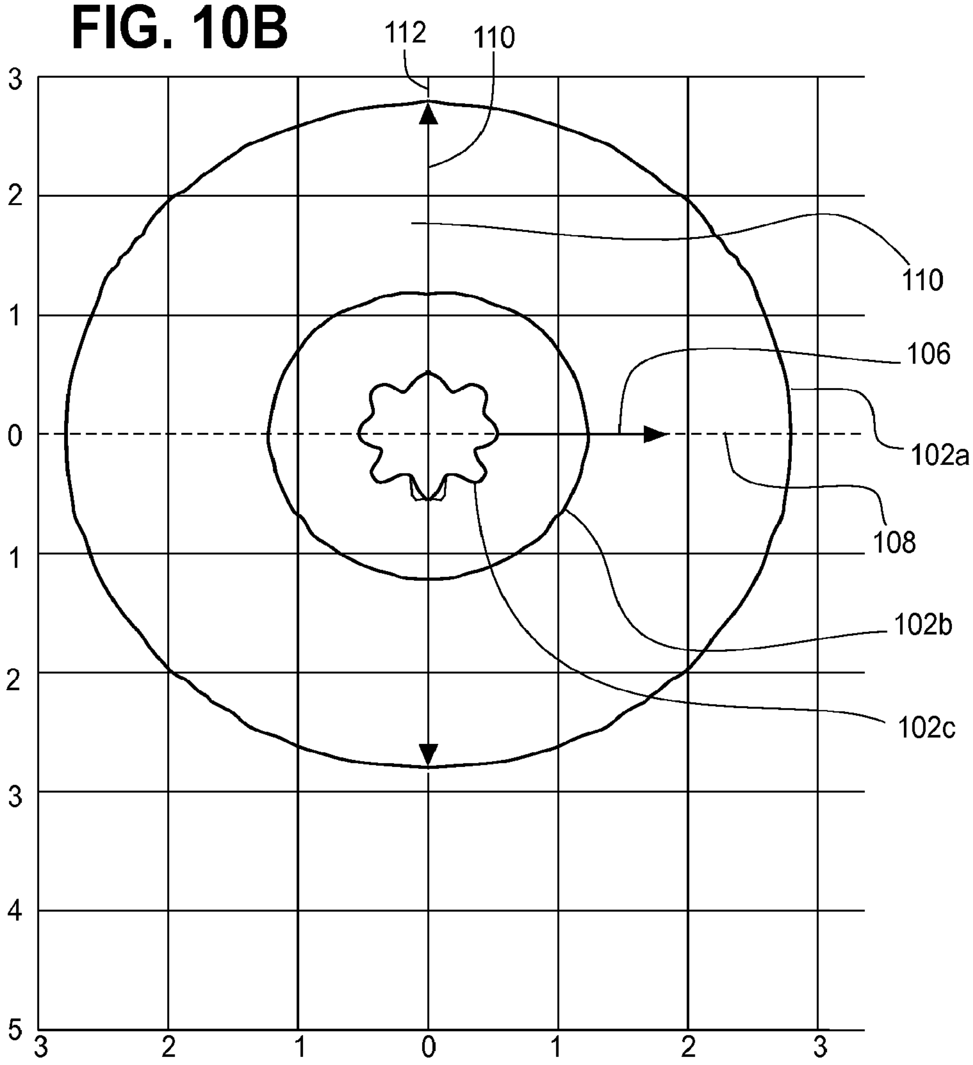

The overall result, when the LED package 52 is energized, is to produce a desired illumination distribution 102, for example, as illustrated by the simulation illumination diagrams of FIGS. 10A and 10B. FIG. 10A illustrates the distribution 102 along a first plane on which the central axis 72 lies. FIG. 10B illustrates the distribution 102 produced along a second plane normal to the central axis 72. The luminaire 50 utilizing the optical member 56 may produce various distributions depending on various parameters such as lumen output and mounting height. For example, as shown in FIG. 10B, the luminaire 50 utilizing the optical member 56 and having a lumen output of about 3,200 lumens may generate about 0.2 foot-candles, about 0.5 foot-candles, and about 1.0 foot-candles of light having first, second, and third distributions 102*a*, 102*b*, 102*c*, respectively, at mounting heights of about 42 feet, about 18.75 feet, and about 7.5 feet, respectively. Each distribution 102*a*, 102*b*, 102*c* of FIG. 10B includes a first extent 106 in an x-direction along an x-axis 108 and a second extent 110 in a y-direction along a y-axis 112 perpendicular to the x-axis 108. The first extent 106 and the second extent 110 are symmetric about the x-axis and y-axis 108, 112, respectively.

FIGS. 11-16 illustrate a further embodiment of an optical member 120 similar to the optical member 56 of FIGS. 3-8 above but having a different shape and illumination distribution. The optical member 120 may be used in the luminaire 20 of FIGS. 1 and 2. It should be noted that, while the optical member 120 is transparent such that all features are visible at all times, the profile of each feature is not always shown in the FIGS. for simplicity.

Figure 11:
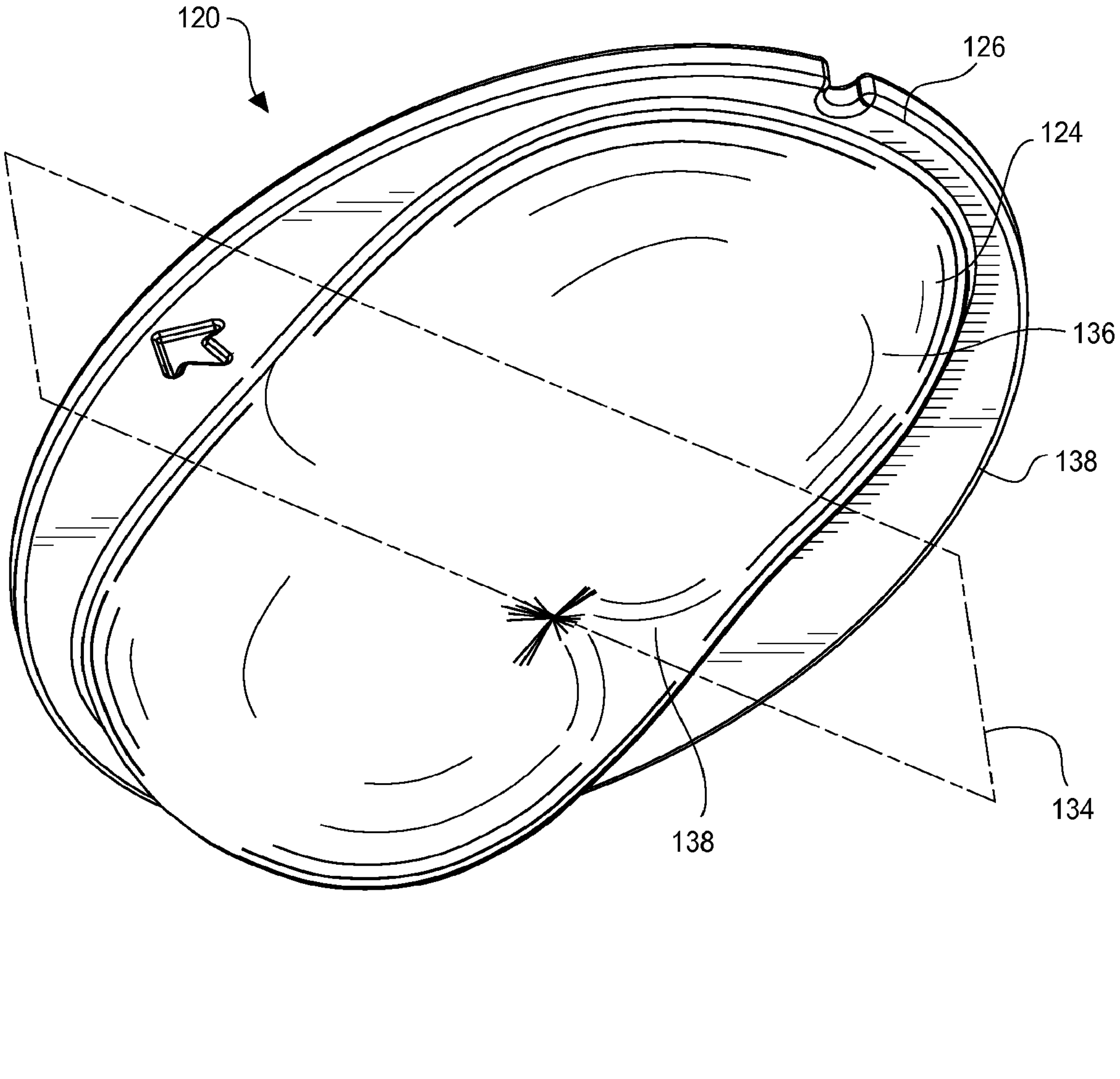
FIG. 11 is an isometric view from below of a further embodiment of an optic.
Figure 12:
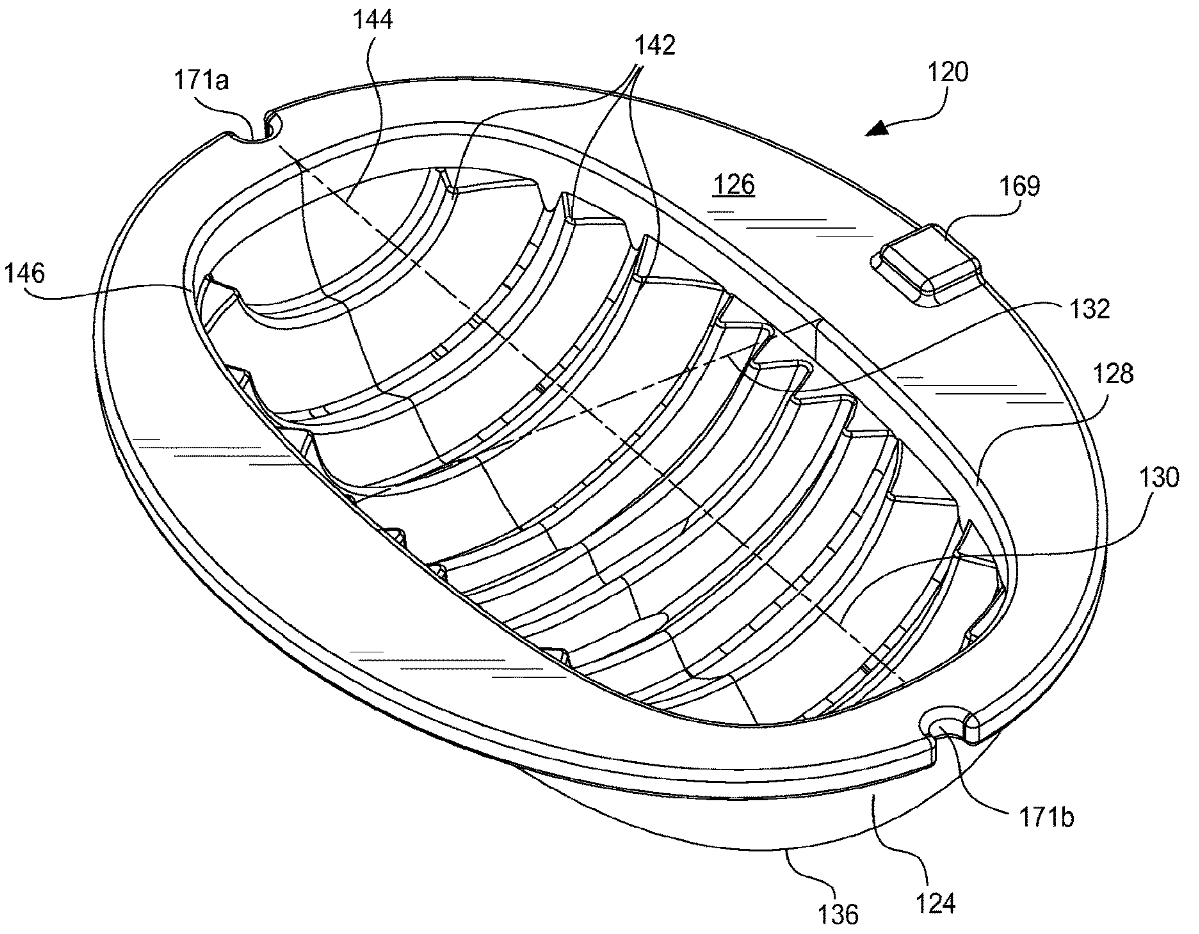
FIG. 12 is an isometric view from above of the embodiment of FIG. 11.
Figure 13:
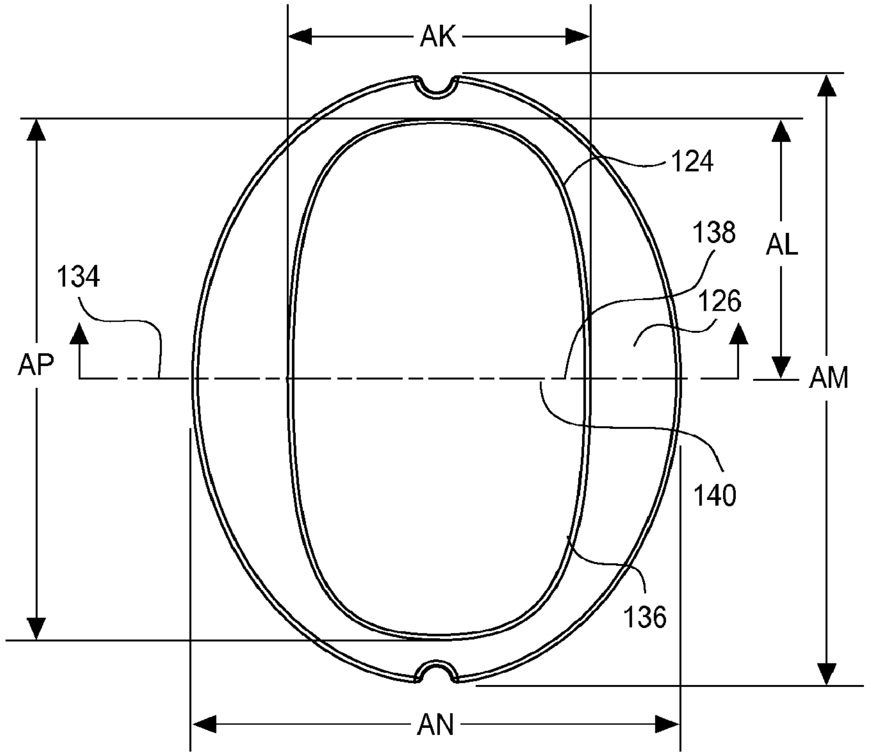
FIG. 13 is a bottom elevational view of the embodiment of FIG. 11.
Figure 14:
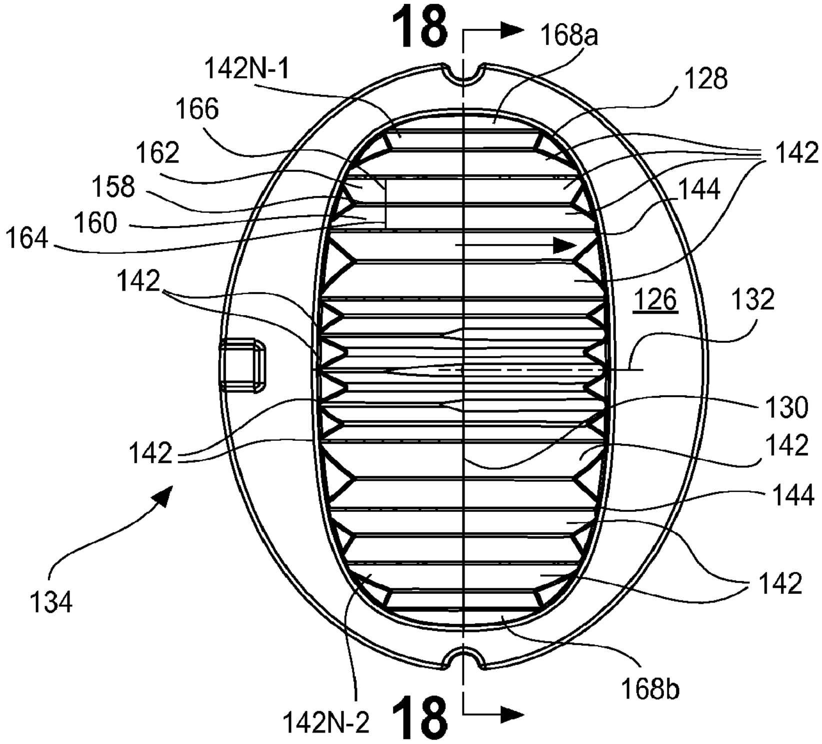
FIG. 14 is a plan view of the embodiment of FIG. 11.

Referring to FIG. 11, the optical member or enclosure 120 includes a curved portion 124 that extends from a base 126. As seen in FIGS. 12 and 14, the curved portion 124 defines an elongate shape 128 at the base 126 having a major axis 130 and a minor axis 132 transverse to the major axis 130. The optical member 120 is symmetric about a plane of symmetry 134 that includes the minor axis 132 and which is normal to the base 126. An outer surface 136 of the curved portion 124 includes at least one indentation 138 that is configured to refract light away from the plane of symmetry 134. As seen in FIG. 13, the indentation 138 is defined at least in part by a line 140 that lies on the plane of symmetry 134.

Referring to FIGS. 12 and 14, a plurality of light redirection features 142 protrudes from an inner surface 144 of the curved portion 124 opposite the outer surface 136. In the illustrated embodiment, each light redirection feature 142 has a curved shape 146 that extends in a linear direction and is parallel to the minor axis 132, although other orientation(s) and/or spacing(s) may be used to produce a desired illumination distribution.

Figure 15:
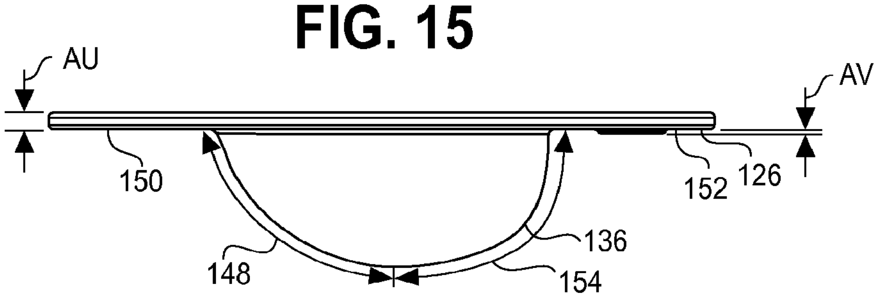
FIG. 15 is a side elevational view of the embodiment of FIG. 11.

As shown in FIG. 15, the outer surface 136 of the curved portion 124 varies between a first side 150 of the optical member 120 and a second side 152 of the optical member 120 opposite the first side 150. The outer surface 136 defines a "free form" or "spline curvature" as described above. In other embodiments, the outer surface 136 may be defined by a specific equation, a curve determined by iteratively plotting the points using a differential or quasi-differential equation, and/or free formed curvature, or a combination thereof. A first extent 148 adjacent the first side 150 has a curvature approximating or defined by a curve having a first radius of curvature, and a second extent 154 adjacent the second side 152 has a curvature approximating or defined by a curve having a second radius of curvature smaller than the first radius of curvature. In one embodiment where the optical member 120 is used for roadway lighting, the optical member 120 is disposed such that the first side 150 is closer to the stanchion or pole 58 (FIG. 1) and the second side 152 is directed toward the roadway (not shown).

Figure 16:
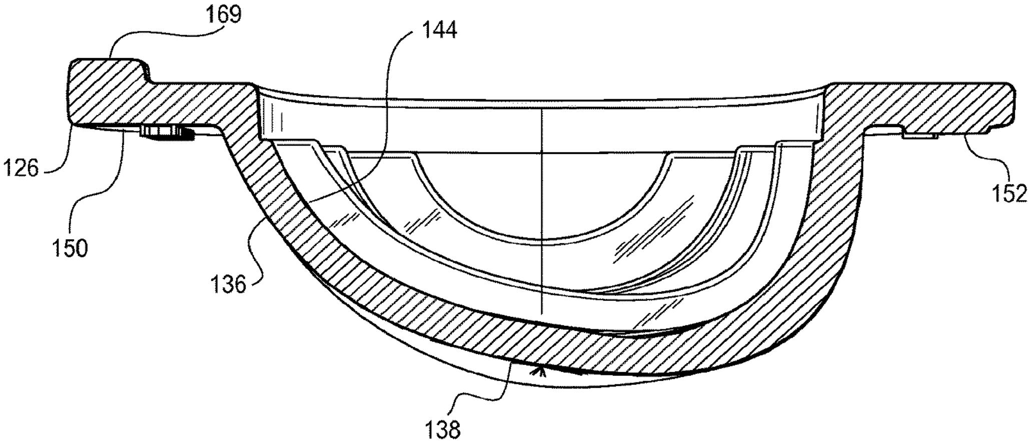
FIG. 16 is a sectional view taken generally along the lines of 16-16 of FIG. 13.

As seen in FIG. 16, the indentation 138 is formed along the first and second extents 148, 154. The inner and outer surfaces 144, 136 of the curved portion 124 define a thickness therebetween, which varies along the minor axis 132.

Figure 17:
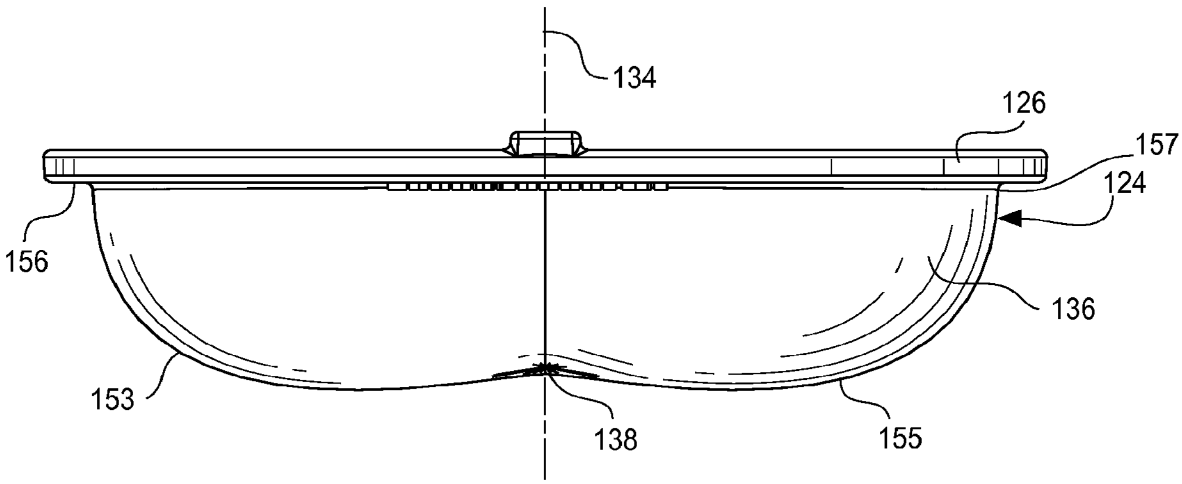
FIG. 17 is a further side elevational view of the embodiment of FIG. 11 transverse to the side elevational view of FIG. 15.

FIG. 17 illustrates the varied curvature of the outer surface 136 of the curved portion 124 viewed from the first side 150. Third and fourth extents 153, 155 of the outer surface 136 of the curved portion 124 adjacent third and fourth sides 156, 157, respectively, of the optical member 120 are mirror images of one another along the plane of symmetry 134. The third and fourth extents 153, 155 of the outer surface 136 are also "Tree form" or "spline curvatures," although the curvature may be otherwise defined as desired.

Figure 18:
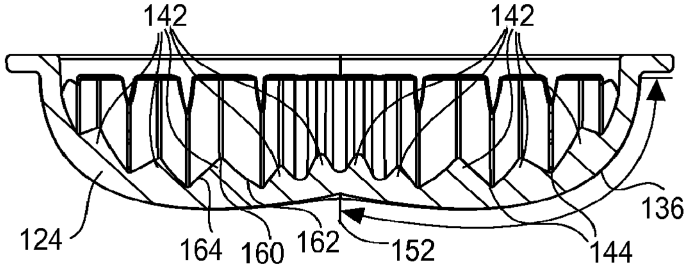
FIG. 18 is a sectional view taken generally along the lines of 18-18 of FIG. 14.

As seen in FIG. 18, each light redirection feature 142 of the illustrated embodiment has a ridge shape that includes a ridge 158 defined by an inner feature surface 160 closer to the minor axis and an outer feature surface 162. The ridge 158 may be filleted as seen in cross section having a radius of curvature of between about 0.5 mm and about 2.0 mm, preferably between about 0.75 mm and about 1.5 mm, and most preferably between about 0.85 mm and about 1.2 mm. The inner feature surface 160 may have a finite radius of curvature along a first extent 164 between the inner surface 144 and the ridge 158. The outer feature surface 162 may be planar along a second extent 166 between the inner surface 144 and the ridge 158. The first and second extents 164, 166 may have curved surfaces, planar surfaces, or a combination thereof. Further, first and second portions 168*a*, 168*b* of the inner surface 144 that extend between the outermost light redirection features 142N-1, 142N-2, respectively, and the base 126 may have a finite radius of curvature. Further, in some embodiments, adjacent light redirection features 142 distal to the indentation 138 are spaced farther apart than adjacent light features 142 proximal to the central axis 138.

Similar to the optical member 56 described above, the optical member 120 as seen in FIG. 12 includes a stub 169 extending from the base 126 that applies pressure to the wires 53 in the channel 57 when the luminaire 50 is assembled. Two locating slots 171*a*, 171*b*, each having a semi-circular cylindrical shape, are disposed along an outer edge 173 of the base 126 opposite to one another and equidistant from the stub 169. An adhesive material such as a UV curable silicone adhesive disposed on the inner surface 54*a* of the housing 54 secures the optical member 56 thereto.

The light developed by the LED package 52 is incident on the light redirection features 142 and is collimated to some degree and redirected outwardly and away from the plane of symmetry 134. The degree of redirection is determined by a number of factors, including the curvature and shape of the light redirection feature(s) 142 and the surfaces that define the indentation 138. In the illustrated embodiment shown in FIGS. 14A, 16A, and 18A, the optical member 120 has the dimensions recited in the following table, it being understood that the dimensions are exemplary only and do not limit the scope of any claims herein, except as may be recited thereby, together with equivalents thereof:

| REFERENCE | NOMINAL DIMENSIONS (in., unless otherwise specified) |
|---|---|
| FIG. 13 | |
| AK | 2.57 |
| AL | 2.28 |
| AM | 4.97 |

-continued

Figure 14A:
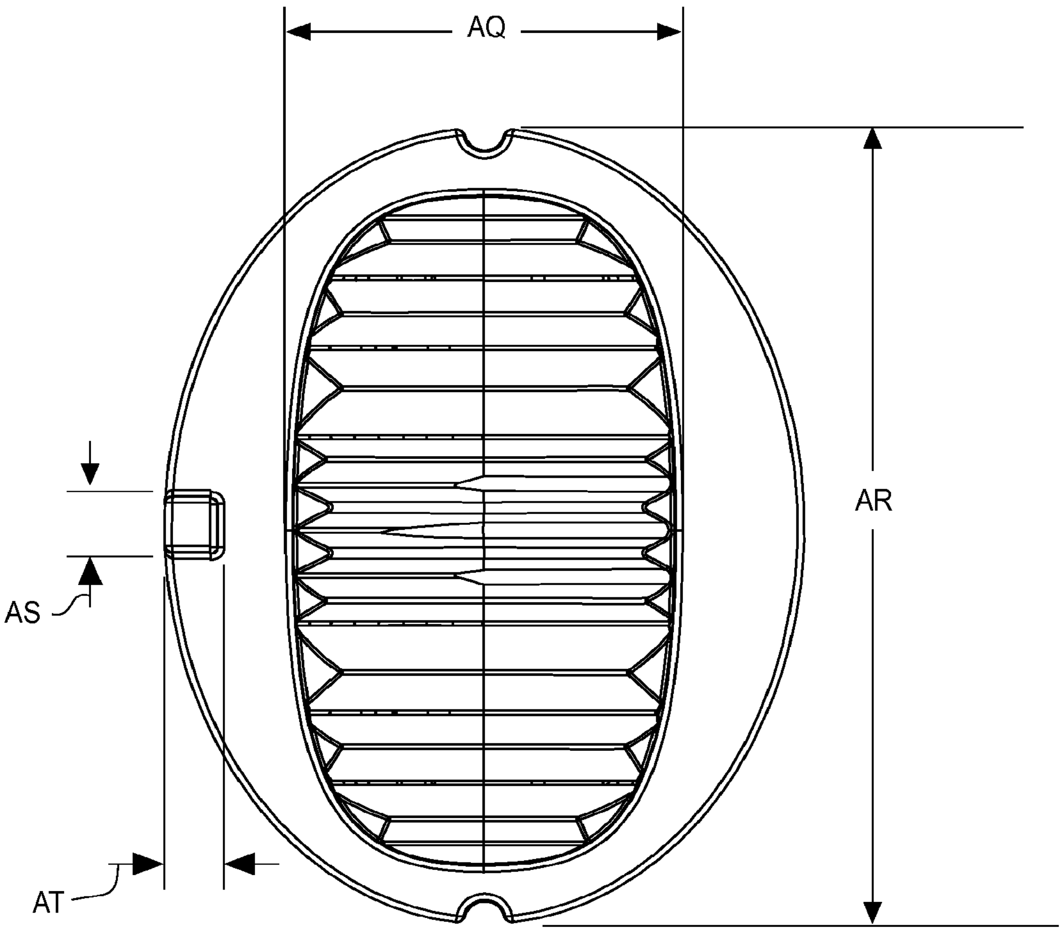
FIG. 14A is a plan view identical to FIG. 14 illustrating sample dimensions for the optical member.
Figure 18A:
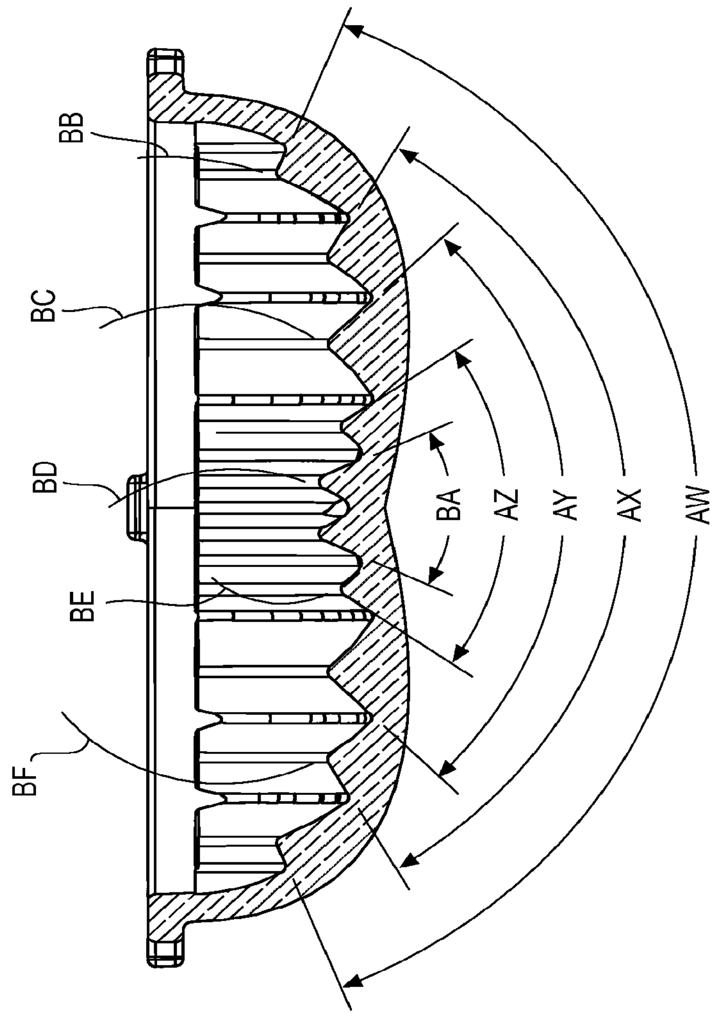
FIG. 18A is a sectional view identical to FIG. 18 illustrating sample dimensions for the optical member.

| REFERENCE | NOMINAL DIMENSIONS (in., unless otherwise specified) |
|---|---|
| AN | 3.67 |
| AP | 4.56 |
| FIG. 14A | |
| AQ | 2.20 |
| AR | 4.94 |
| AS | 0.35 |
| AT | 0.29 |
| FIG. 15 | |
| AU | 0.18 |
| AV | 0.10 |
| FIG. 18A | |
| AW | 136.0 degrees |
| AX | 120.0 degrees |
| AY | 90.0 degrees |
| AZ | 70.0 degrees |
| BA | 50.0 degrees |
| BB | 1.5 (radius of curvature) |
| BC | 1.0 (radius of curvature) |
| BD | 1.0 (radius of curvature) |
| BE | 0.5 (radius of curvature) |
| BF | 1.0 (radius of curvature) |

The curved portion 124 of the optical member 120 has a thickness defined by the inner and outer surfaces 144, 136 that varies. The thickness may range from about 3 mm to about 6 mm, preferably from about 3.5 mm to about 5.5 mm, and most preferably from about 4 mm to about 5 mm. Further, the thickness of the optical member 120 at the light redirection features 142 may range from about 0.29 in, (7.366 mm) to about 0.40 in. (10.16 mm). The curved portion 124 may have a first thickness adjacent to the indentation 138 and a second thickness greater than the first thickness adjacent to the light redirection feature 142. The optical member 120 illustrated in FIGS. 11-16 may exhibit an optical efficiency of at least about 70%, preferably at least about 80%, and most preferably at least about 89%.

Figure 19A:
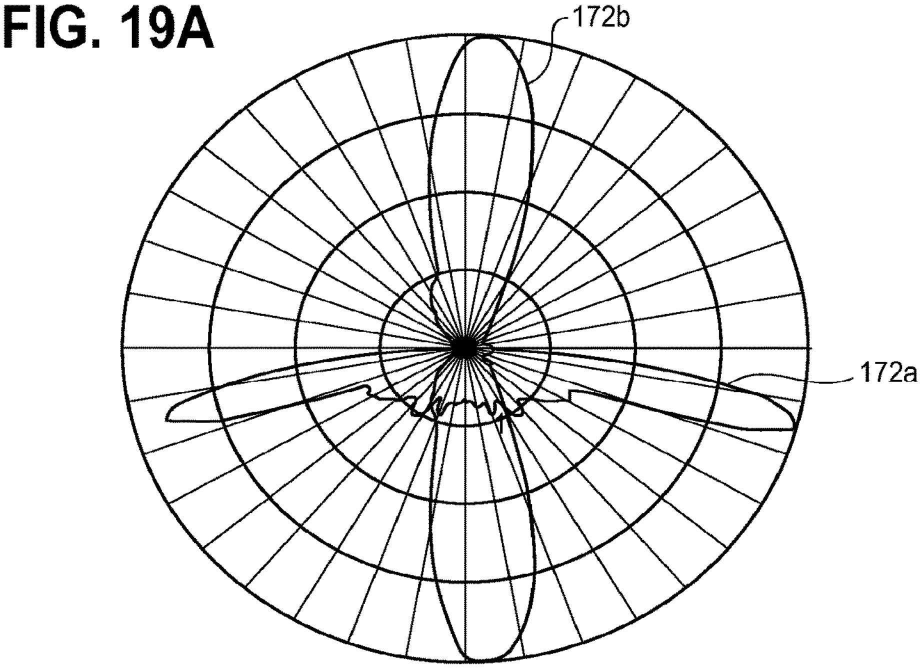
FIG. 19A is a side elevational view and a plan view of an illumination distribution produced by the embodiment of FIG. 11.
Figure 19B:
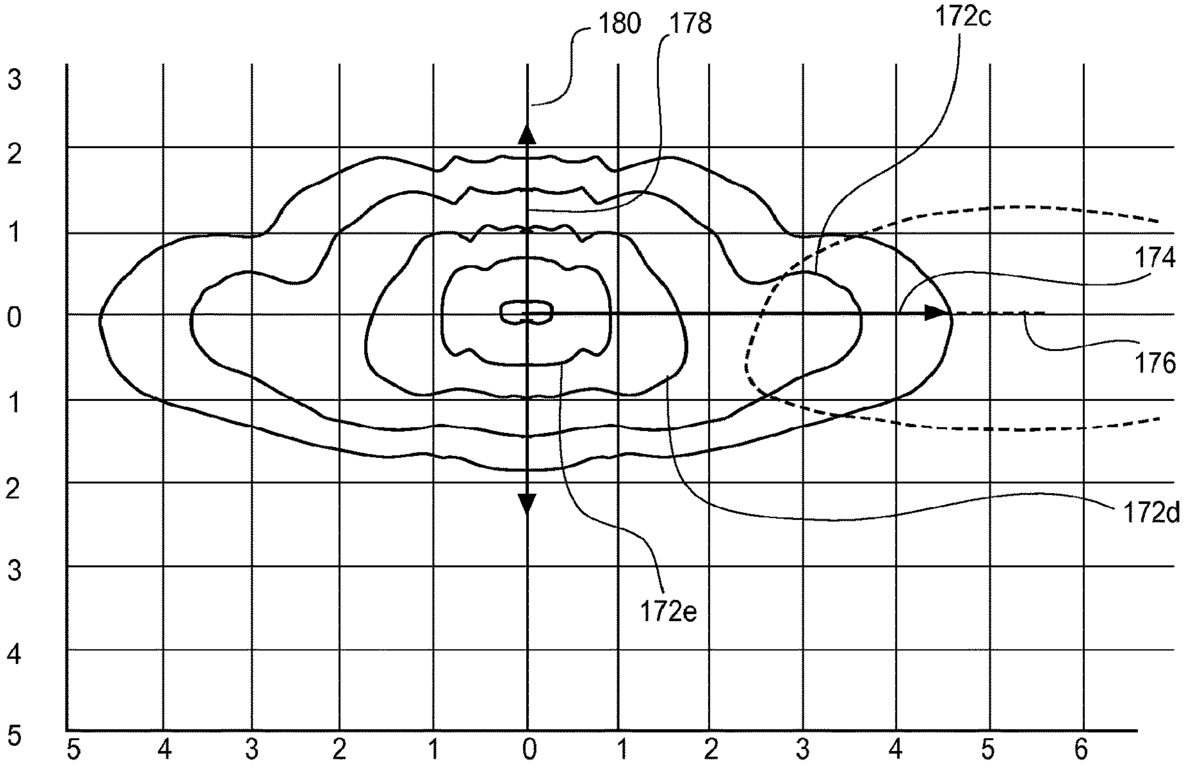
FIG. 19B is a plan view of illumination distributions produced by the embodiment of FIG. 11.

The overall result, when the LED package 52 is energized, is to produce a desired illumination distribution 172, for example, as illustrated by the simulation illumination diagrams of FIGS. 19A and 19B. FIG. 19A illustrates a first distribution 172*a* produced along a first plane on which the major axis 130 lies and is perpendicular to the minor axis 132 and a second distribution 172*b* produced along a second plane parallel to the base 126 on which both of the major and minor axes 130, 132 lie. FIG. 19B illustrates sample distributions 172 produced along the second plane at various mounting heights. Such distributions may also depend on other parameter(s) such as lumen output. For example, as shown in FIG. 19B, the luminaire 50 utilizing the optical member 120 and having a lumen output of about 3, 100 lumens may generate about 0.2 foot-candles, about 0.5 foot-candles, and about 1.0 foot-candles of light having first, second, and third distributions 172*c*, 172*d*, 172*e*, respectively, at mounting heights of about 56.25 feet, about 26.25 feet, and about 15 feet, respectively. The distribution of FIG. 19B includes a first extent 174 along an x-axis 176 and a second extent 178 shorter than the first extent 174 along ay-axis 180 perpendicular to the x-axis 176.

Any of the embodiments disclosed herein may include a power circuit having a buck regulator, a boost regulator, a buck-boost regulator, a SEPIC power supply, or the like, and may comprise a driver circuit as disclosed in U.S. patent application Ser. No. 14/291,829, filed May 30, 2014, entitled "High Efficiency Driver Circuit with Fast Response" by Hu et al. or U.S. patent application Ser. No. 14/292,001, filed May 30, 2014, entitled "SEPIC Driver Circuit with Low Input Current Ripple" by Hu et al. incorporated by reference herein. The circuit may further be used with light control circuitry that controls color temperature of any of the embodiments disclosed herein in accordance with viewer input such as disclosed in U.S. patent application Ser. No. 14/292,286, filed May 30, 2014, entitled "Lighting Fixture Providing Variable CCT" by Pope et al. incorporated by reference herein.

Further, any of the embodiments disclosed herein may be used in a luminaire having one or more communication components forming a part of the light control circuitry, such as an RF antenna that senses RF energy. The communication components may be included, for example, to allow the luminaire to communicate with other luminaires and/or with an external wireless controller, such as disclosed in U.S. patent application Ser. No. 13/782,040, filed Mar. 1, 2013, entitled "Lighting Fixture for Distributed Control" or U.S. Provisional Application No. 61/932,058, filed Jan. 27, 2014, entitled "Enhanced Network Lighting" both owned by the assignee of the present application and the disclosures of which are incorporated by reference herein. More generally, the control circuitry includes at least one of a network component, an RF component, a control component, and a sensor. The sensor, such as a knob-shaped sensor, may provide an indication of ambient lighting levels thereto and/or occupancy within the room or illuminated area. Such sensor may be integrated into the light control circuitry.

INDUSTRIAL APPLICABILITY

In summary, the disclosed luminaire provides an aesthetically pleasing, sturdy, cost effective lighting assembly for use in lighting a large area such as a parking lot or deck of a parking garage and/or along a roadway. The lighting is accomplished with reduced glare as compared to conventional lighting systems.

The light redirection features and indentation disclosed herein efficiently redirect light out of the optic. At least some of the luminaires disclosed herein are particularly adapted for use in outdoor or indoor general illumination products (e.g., streetlights, high-bay lights, canopy lights, parking lot or parking structure lighting, yard or other property lighting, rural lighting, walkway lighting, warehouse, store, arena or other public building lighting, or the like). According to one aspect the luminaires disclosed herein are adapted for use in products requiring a total lumen output of between about 1,000 and about 12000 lumens or higher, and, more preferably, between about 4,000 and about 10,000 lumens and possibly higher, and, most preferably, between about 4,000 and about 8,000 lumens. According to another aspect, the luminaires develop at least about 2000 lumens. Further, efficacies between about 75 and about 140 lumens per watt, and more preferably between about 80 and about 125 lumens per watt, and most preferably between about 90 and about 120 lumens per watt can be achieved. Still further, the luminaires disclosed herein preferably have a color temperature of between about 2500 degrees Kelvin and about 6200 degrees Kelvin, and more preferably between about 2500 degrees Kelvin and about 5000 degrees Kelvin, and most preferably between about 3500 degrees Kelvin and about 4500 degrees Kelvin. Further, the optical efficiency may range from about 70% to about 95%, most preferably from about 80% to about 90%. A color rendition index (CRI) of between about 70 and about 80 is preferably attained by at least some of the luminaires disclosed herein, with a CRI of at least about 70 being more preferable. Any desired particular output light distribution, such as a butterfly light distribution, could be achieved, including up and down light distributions or up only or down only distributions, etc.

When one uses a relatively small light source which emits into a broad (e.g., Lambertian) angular distribution (common for LED-based light sources), the conservation of etendue, as generally understood in the art, requires an optical system having a large emission area to achieve a narrow (collimated) angular light distribution. In the case of parabolic reflectors, a large optic is thus generally required to achieve high levels of collimation. In order to achieve a large emission area in a more compact design, the prior art has relied on the use of Fresnel lenses, which utilize refractive optical surfaces to direct and collimate the light. Fresnel lenses, however, are generally planar in nature, and are therefore not well suited to re-directing high-angle light emitted by the source, leading to a loss in optical efficiency. In contrast, in the present invention, light is coupled into the optic, where primarily TIR is used for re-direction and collimation. This coupling allows the full range of angular emission from the source, including high-angle light, to be redirected and collimated, resulting m higher optical efficiency in a more compact form factor.

In at least some of the present embodiments, the distribution and direction of light within the optical member is better known, and hence, light is controlled and extracted in a more controlled fashion.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar references in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

Numerous modifications to the present disclosure will be apparent to those skilled in the art in view of the foregoing description. Preferred embodiments of this disclosure are described herein, including the best mode known to the inventors for carrying out the disclosure. It should be understood that the illustrated embodiments are exemplary only, and should not be taken as limiting the scope of the disclosure.

The invention claimed is:

1. A lighting device, comprising:

a housing comprising a base having a first surface opposite a second surface, and at least one central wall extending along a longitudinal axis of the base to a curved outer wall surrounding the first surface of the base and extending away from the second surface of the base; and a light source mounted on the second surface of the base.

2. The lighting device of claim 1 further comprising a cavity extending between an outer edge of the first surface and the outer wall.

3. The lighting device of claim 1 wherein the first surface slopes to the outer edge such that a thickness of the base near the central wall is greater than a thickness of the base near the outer edge thereof.

4. The lighting device of claim 1 wherein the light source comprises one or more LED elements disposed in the housing.

5. The lighting device of claim 1, wherein the light source is mounted to the second surface by a bracket, an adhesive material, or both.

6. The lighting device of claim 1, wherein the light source is mounted to the second surface by an adhesive material or a bracket in combination with an adhesive material, wherein the adhesive material comprises a UV curable silicone.

7. The lighting device of claim 1, further comprising an ambient light sensor.

8. The lighting device of claim 7, wherein the ambient light sensor extends vertically from a top side of the housing.

9. A lighting device comprising:

a housing comprising a base having a first surface opposite a second surface, at least one central wall extending along a longitudinal axis of the base to a curved outer wall surrounding the first surface of the base and extending away from the second surface of the base, and a plurality of curved fins extending between the central wall and the curved outer wall the base; and a light source mounted on the second surface of the base.

10. The lighting device of claim 9, wherein the curved fins extend to a perimeter of the curved outer wall.

11. The lighting device of claim 10, wherein the curved fins extend outward from the longitudinal axis.

12. The lighting device of claim 9 wherein the first surface slopes to the outer edge such that a thickness of the base near the central wall is greater than a thickness of the base near the outer edge thereof.

13. The lighting device of claim 9 wherein the light source comprises one or more LED elements disposed in the housing.

14. The lighting device of claim 9, wherein the light source is mounted to the second surface by a bracket, an adhesive material, or both.

15. The lighting device of claim 9, wherein the light source is mounted to the second surface by an adhesive material or a bracket in combination with an adhesive material, wherein the adhesive material comprises a UV curable silicone.

16. The lighting device of claim 9, further comprising an ambient light sensor.

17. The lighting device of claim 16, wherein the ambient light sensor extends vertically from a top side of the housing.

18. The lighting device of claim 9 further comprising a cavity extending between an outer edge of the first surface and the outer wall.

19. The lighting device of claim 18, wherein the cavity extends between adjacent curved fins.

20. The lighting device of claim 9, wherein the curved fins curve in a direction away from the longitudinal axis.

* * * * *